US012592985B2

(12) United States Patent
Anderson, III et al.

(10) Patent No.: US 12,592,985 B2
(45) Date of Patent: *Mar. 31, 2026

(54) SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE

(71) Applicant: SailPoint Technologies, Inc., Wilmington, DE (US)

(72) Inventors: Norman Anderson, III, Austin, TX (US); Jeffrey Foreman, Round Rock, TX (US); Amar Rama, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,259

(22) Filed: May 6, 2024

(65) Prior Publication Data

US 2024/0291896 A1     Aug. 29, 2024

Related U.S. Application Data

(63) Continuation of application No. 17/848,057, filed on Jun. 23, 2022, now Pat. No. 12,015,675, which is a continuation of application No. 16/749,577, filed on Jan. 22, 2020, now Pat. No. 11,388,255, which is a continuation of application No. 16/440,690, filed on Jun. 13, 2019, now Pat. No. 10,623,520.

(51) Int. Cl.
| | | |
|---|---|---|
| *G06F 16/00* | (2019.01) | |
| *G06F 16/22* | (2019.01) | |
| *G06F 16/242* | (2019.01) | |
| *H04L 67/306* | (2022.01) | |

(52) U.S. Cl.
CPC ........ *H04L 67/306* (2013.01); *G06F 16/2264* (2019.01); *G06F 16/2443* (2019.01)

(58) Field of Classification Search
None
See application file for complete search history.

(56) References Cited

U.S. PATENT DOCUMENTS

| | | | | | |
|---|---|---|---|---|---|
| 4,525,780 | A | * | 6/1985 | Bratt | ..................... G06F 9/4843 |
| | | | | | 711/163 |
| 5,173,939 | A | * | 12/1992 | Abadi | ..................... G06F 9/468 |
| | | | | | 707/999.009 |
| 5,315,657 | A | * | 5/1994 | Abadi | ..................... G06F 9/468 |
| | | | | | 340/5.74 |
| 5,335,346 | A | * | 8/1994 | Fabbio | .................. G06F 16/289 |
| | | | | | 711/163 |

(Continued)

*Primary Examiner* — Bai D Vu

(74) *Attorney, Agent, or Firm* — Sprinkle IP Law Group

(57) ABSTRACT

First level fields may include second-level fields or nested-level fields, as will be described at a later point. When a category to search within to find data is specified in a search, the deepest category searched in is the first-level field. In some cases, only a single field is needed for a search. This is the first-level field. If more than one field to is needed to find desired data, the category that is typed last and that appears closest to the search terms in the query, is the first-level field. A first-level field contains actual data, as opposed to containing additional fields to search in.

20 Claims, 10 Drawing Sheets

(56)                    References Cited

U.S. PATENT DOCUMENTS

| | | | | | |
|---|---|---|---|---|---|
| 5,347,578 | A | * | 9/1994 | Duxbury | G06F 21/6281 |
| | | | | | 707/999.009 |
| 5,701,458 | A | * | 12/1997 | Bsaibes | H04L 9/40 |
| | | | | | 707/999.009 |
| 5,825,877 | A | * | 10/1998 | Dan | H04L 63/12 |
| | | | | | 705/54 |
| 5,956,715 | A | * | 9/1999 | Glasser | G06F 16/185 |
| | | | | | 707/999.009 |
| 6,157,052 | A | * | 12/2000 | Kuge | H10B 12/30 |
| | | | | | 257/211 |
| 6,202,066 | B1 | * | 3/2001 | Barkley | G06F 21/6218 |
| | | | | | 707/999.009 |
| 6,237,036 | B1 | * | 5/2001 | Ueno | H04L 63/101 |
| | | | | | 709/201 |
| 6,772,350 | B1 | * | 8/2004 | Belani | H04L 63/101 |
| | | | | | 707/999.009 |
| 6,816,906 | B1 | * | 11/2004 | Icken | H04L 63/101 |
| | | | | | 709/219 |
| 7,016,945 | B2 | * | 3/2006 | Bellaton | H04L 61/4523 |
| | | | | | 709/219 |
| 7,380,271 | B2 | * | 5/2008 | Moran | G06F 21/6218 |
| | | | | | 726/21 |
| 10,623,520 | B1 | * | 4/2020 | Anderson, III | G06F 16/2443 |
| 2001/0056494 | A1 | * | 12/2001 | Trabelsi | G06F 9/468 |
| | | | | | 709/229 |
| 2002/0026592 | A1 | * | 2/2002 | Gavrila | G06F 21/6218 |
| | | | | | 709/229 |
| 2004/0216039 | A1 | * | 10/2004 | Lane | G06Q 10/10 |
| | | | | | 715/229 |
| 2007/0208744 | A1 | * | 9/2007 | Krishnaprasad | H04L 63/0815 |
| | | | | | 707/999.009 |

* cited by examiner

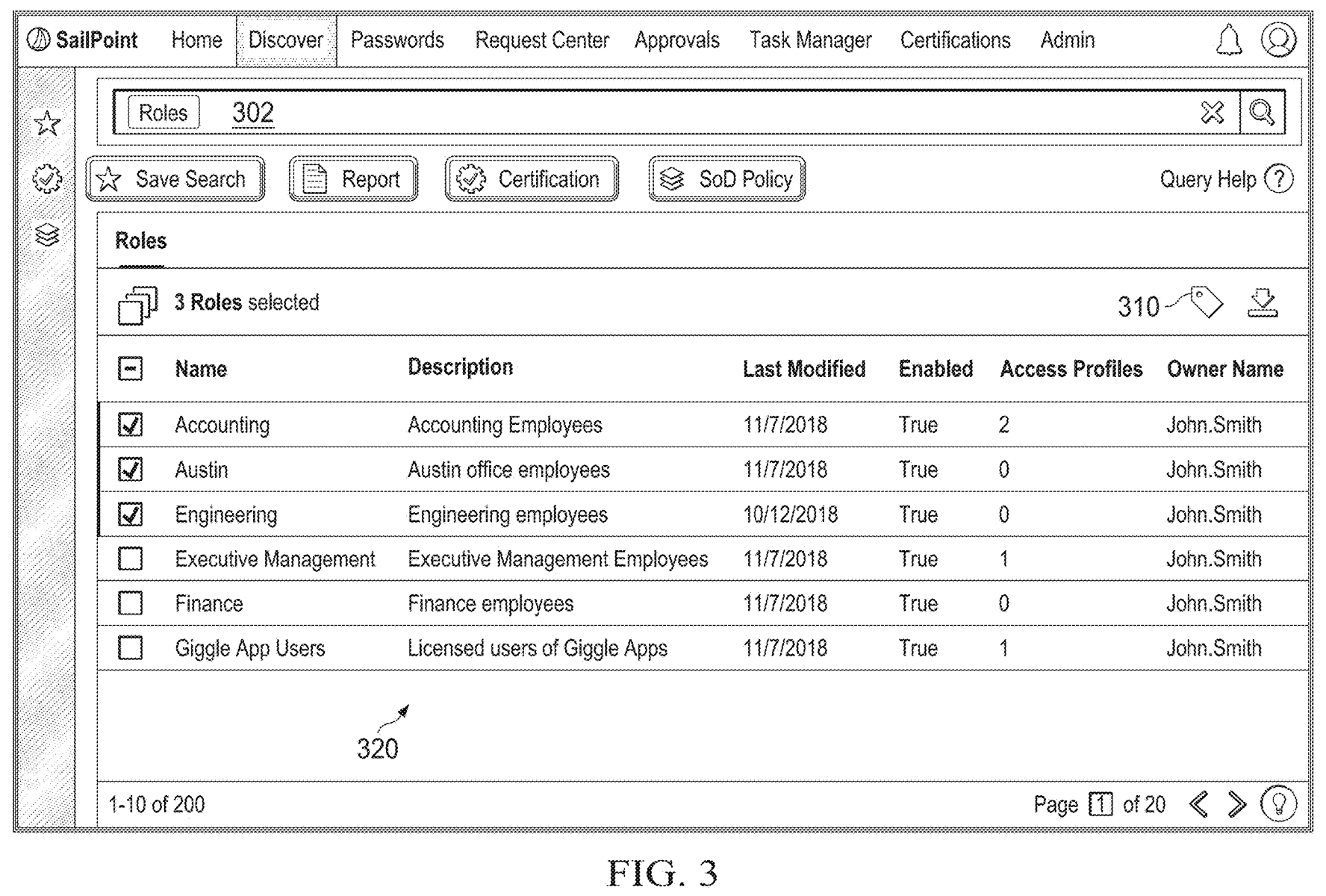

SailPoint   Home   Discover   Passwords   Request Center   Approvals   Task Manager   Certifications   Admin Roles   302

Query Help ?

Save Search   Report   Certification   SoD Policy

310

Roles

3 Roles selected

320

| | Name | Description | Last Modified | Enabled | Access Profiles | Owner Name |
|---|---|---|---|---|---|---|
| ☑ | Accounting | Accounting Employees | 11/7/2018 | True | 2 | John.Smith |
| ☑ | Austin | Austin office employees | 11/7/2018 | True | 0 | John.Smith |
| ☑ | Engineering | Engineering employees | 10/12/2018 | True | 0 | John.Smith |
| ☐ | Executive Management | Executive Management Employees | 11/7/2018 | True | 1 | John.Smith |
| ☐ | Finance | Finance employees | 11/7/2018 | True | 0 | John.Smith |
| ☐ | Giggle App Users | Licensed users of Giggle Apps | 11/7/2018 | True | 1 | John.Smith |

1-10 of 200        Page 1 of 20

FIG. 3

Figure 6A:
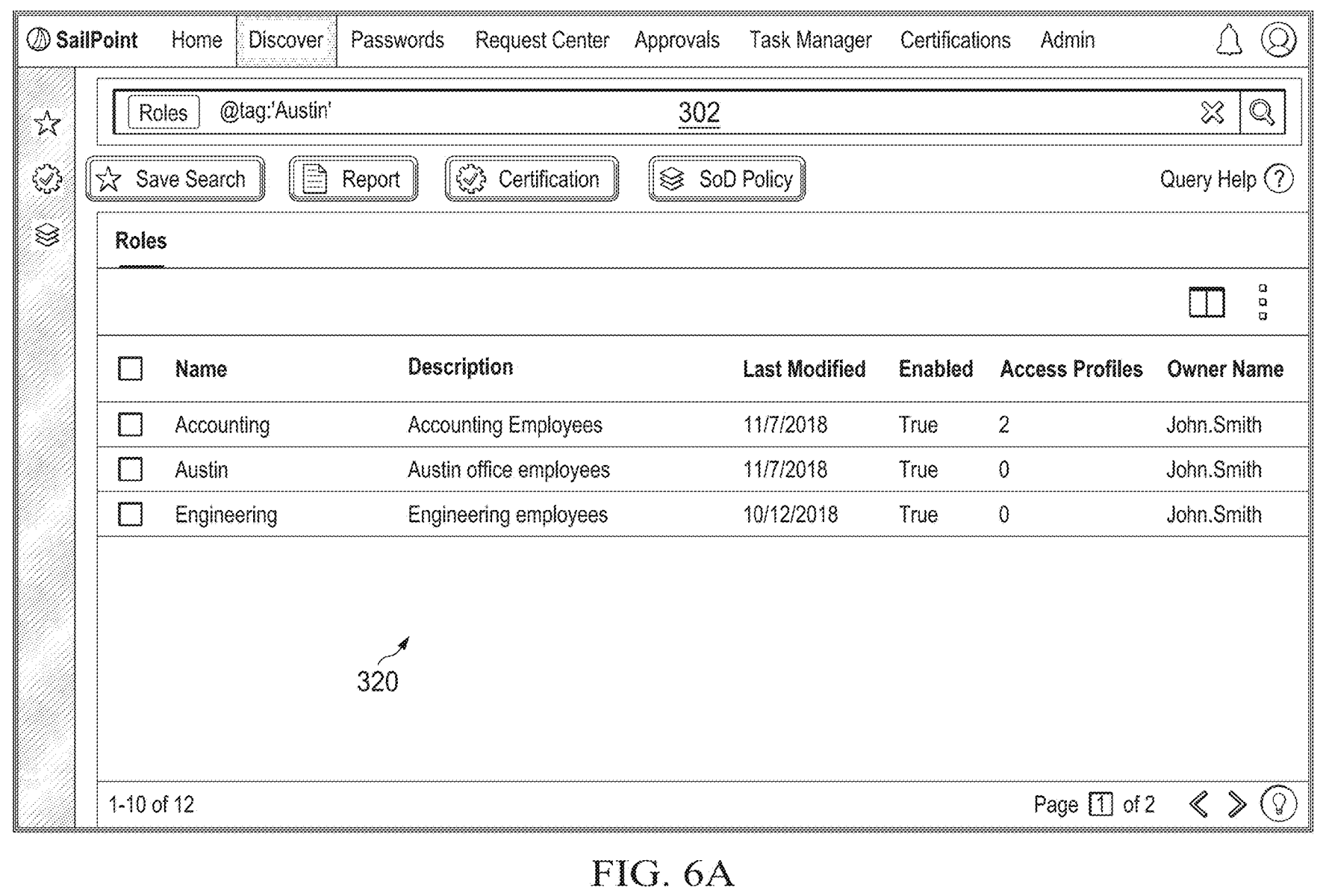

SailPoint   Home | Discover | Passwords   Request Center   Approvals   Task Manager   Certifications   Admin Roles | @tag:'Austin'   302     Query Help (?)

Save Search   Report   Certification   SoD Policy

Roles

| | Name | Description | Last Modified | Enabled | Access Profiles | Owner Name |
|---|---|---|---|---|---|---|
| ☐ | Accounting | Accounting Employees | 11/7/2018 | True | 2 | John.Smith |
| ☐ | Austin | Austin office employees | 11/7/2018 | True | 0 | John.Smith |
| ☐ | Engineering | Engineering employees | 10/12/2018 | True | 0 | John.Smith |

320

1-10 of 12     Page ☐ of 2

SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE

RELATED APPLICATIONS

This application is a continuation of, and claims a benefit of priority under 35 U.S.C. 120 from, U.S. patent application Ser. No. 17/848,057 filed Jun. 23, 2022, entitled "SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE," which is a continuation of, and claims a benefit of priority under 35 U.S.C. 120 from, U.S. patent application Ser. No. 16/749,577 filed Jan. 22, 2020, issued as U.S. Pat. No. 11,388,255, entitled "SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE," which is a continuation of, and claims a benefit of priority under 35 U.S.C. 120 from, U.S. patent application Ser. No. 16/440,690 filed Jun. 13, 2019, issued as U.S. Pat. No. 10,623,520, entitled "SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE," which are hereby fully incorporated herein by reference for all purposes.

COPYRIGHT NOTICE

TECHNICAL FIELD

This disclosure relates generally to computer security. In particular, this disclosure relates to the application of artificial intelligence to identity management in a distributed and networked computing environment. Even more specifically, this disclosure relates to enhancing computer security in a distributed networked computing environment through the use of tagging in these artificial intelligence based identity management systems, including the use of tagging for improved searching, workflow and identity governance within such distributed and networked computer environments.

BACKGROUND

Acts of fraud, data tampering, privacy breaches, theft of intellectual property, and exposure of trade secrets have become front page news in today's business world. The security access risk posed by insiders-persons who are granted access to information assets—is growing in magnitude, with the power to damage brand reputation, lower profits, and erode market capitalization.

Identity Management (IM), also known as Identity and Access Management (IAM) or Identity Governance (IG), is the field of computer security concerned with the enable-ment and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex and specific, context may be desirable from a variety of perspectives, including managers, owners, IT or security/ regulatory departments, or others. Without such complex contextual data information management systems may suffer from low workflow efficiency and lower security.

What is desired therefore, are improved systems and methods for identity governance that provide an infrastructure for detailed and relevant contextual identity governance information.

SUMMARY

As mentioned, it is usually required for identity management solutions to deliver the capability for the creation, ongoing management, display, and distribution of detailed and relevant contextual identity governance information for an enterprise. This desire is prevalent at least because within the IG space today, the best approaches to providing any sort of useful context are manual, ad hoc, and error prone (e.g., not repeatable with consistent outcomes). These limited approaches are not consistent, efficient, timely, or scalable. For example, organizations or enterprises (collectively enterprises herein) may use email, chat systems, names, descriptions, or phone calls to share information inside and outside their IG solutions in an effort to provide missing or desired context. This manual approach requires ongoing human engagement to repeatedly and continuously resolve the same issue. This leads to low workflow efficiency, loss of productivity, poor decision quality, lower security, and noncompliance, amongst a host of other issues.

Accordingly, to ameliorate or address these issues, among other ends, embodiments of the identity management systems disclosed herein may support the creation, association, searching (e.g., querying), or visualization of any relevant context to IG assets by program owners or context owners (e.g., business (managers, owners), IT (source owners), and security/regulatory departments) for a variety of purposes, including for informing the identity management systems' manual (e.g., user involved), automated, or machine learning, decisions, processes or workflows.

In particular, identity management systems as disclosed may obtain data on identity management artifacts (e.g., such as an identity, entitlement, role, event, access profile or account activity) such that these artifacts may be associated and managed accordingly. These artifacts may be imported or determined from data obtained from a set of source systems within an enterprise. Embodiment of an identity management system may allow tags to be assigned or otherwise associated with these managed identity management artifacts, where these tags may be assigned via a manual (e.g., user involved) process or an automated process (e.g., such that tags may be assigned in a substantially programmatically or automated fashion through the operation of the identity management system itself). These designations (e.g., tags) are not restricted by the sources (e.g., from the identity management artifact was obtained) or indeed even the constructs of the identity management system itself. Accordingly, such tag assignments may be virtually unconstrained. The tags assigned may thus reflect a particular user's insight, view or knowledge of particular identity management artifacts and may additionally reflect that user's nomenclature (e.g., the nomenclature reflecting the context of the user, the user's groups, the enterprise to which the user belongs, etc.).

A user involved process for the assignment of tags may be, for example, searching for a set of artifacts that meet a particular set of search criteria (including searching by tags themselves) and assigning particular tags to the resulting set of artifacts. Similarly, an automated process may be a tagging policy comprising a saved search and one or more corresponding tags. The tagging policy may be executed on a time period basis by the identity management system (e.g., every hour, every day, etc.) by executing the search to determine the set of artifacts resulting from the search and applying the corresponding tags of the policy to the resulting artifacts. In this manner, tags can be automatically associated with artifacts that are currently managed by the identity management system and may also be applied to future artifacts that may be determined or added to the identity management system (e.g., imported or added from source systems within the enterprise).

In another example, an automated process for the assignment of tags in an identity management system may involve the assignment of such tags as data on artifacts is imported or determined from the data obtained from the source systems within the enterprise. Here, tagging policies may be defined so that appropriate tagging of artifacts occurs immediately when the artifact is initially created or updated within the identity management system. This ensures the state of an artifact and its tags are persisted and synchronized before the downstream governance policies are evaluated. By tagging these artifacts as they are initially created or updated, embodiments of the identity management system may provide subsequent governance workflows or decision points the ability to consume these tags as additional context to improve automated or manual governance decisions (e.g. access provisioning, Life Cycle State (LCS), role assignment, etc.). These tags also become available to other aspects of an identity management system, such as artificial intelligence components, to improve security.

In these types of embodiments tagging policies may be defined, where the tagging policy may comprise a policy definition, including a combination or composite of data and one or more associated tags. As artifacts are created or updated the tagging policies may be evaluated for the created or updated artifacts by evaluating the tagging definition using the data associated with the created or updated artifact. If the tagging definition is true (or false) the artifact may be tagged with the associated tags for the tagging policy. The tagging definition for a tagging policy may be an expression (e.g., a Boolean or other type of expression) based on almost any type or combination of the data available in the data obtained from the source systems or utilized by the identity management system, including, for example, identity or account attributes, source or entitlement information, existing access rights. Thus, such tagging policy definitions may provide fine grained control of tagging.

An embodiment of this type of tagging may utilize an identity management systems provisioning capability whereby accounts and entitlements data are obtained from source systems of the enterprise, identities are created and governance policy driven processes may be initiated. As an example of some cases where such automated tagging may be useful. A tagging policy may specify a definition that indicates when an account artifact is being created or updated from a credit card processing source system in an enterprise, if the source's name is a particular name that account artifact will be tagged with a certain tag (e.g., a "PCI" tag). As an example of a tagging policy that may defined for an identity artifact, as account artifacts are correlated with an identity, a tagging policy may specify a policy definition that indicates when an identity artifact is being created or updated with correlated accounts if the accounts include an account with a particular human resources (HR) account attribute (e.g., "Executive") and a particular payroll account attribute (e.g., "Stock Holder"), the identity artifact will be tagged with a certain tag (e.g., a "Insider Trader Risk") tag.

Moreover, tagging policies may specify the automatic tagging of an artifact with tags from another artifact based on a specified association between the two artifacts. These types of tagging policies may specify two artifact types and an association, such that if an artifact of the first type is assigned that association with an artifact of the second type, that artifact is given one or more tags of the first artifact. For example, a tagging policy may specify that any identity artifact should be assigned the tags of any entitlement artifact for which that identity artifact has been granted access (e.g., through an access request). Accordingly, if an identity artifact is granted access to an entitlement with a particular tag (e.g., "highly privileged") that identity artifact may be assigned that tag as well (e.g., assigned the "highly privileged" tag). In this way tags may be automatically propagated between artifacts based on the occurrence of an event specified in the tagging policy.

In a similar manner tagging policies may also be used to govern the visibility of identity management data or artifacts themselves. For example, a tagging policy may specify that only identity management artifacts (e.g., identities or roles) associated with a certain tag (e.g., "highly privileged") may (or may not) access identity management data associated with another (or the same) tag (e.g., "confidential"). As the tags assigned to artifacts may be virtually unconstrained and may reflect a particular user's insight, view or knowledge. Such tagging policies may allow a user to drive the configuration of various identity governance processes through subject matter context (e.g., the tags) that is pertinent to them. Additionally, these types of tagging policies may enable domain users to specify which access is needed by which individuals without engaging an expert user such as the IT department of the enterprise. In particular, tagging of artifacts in the context of identity management system may be decentralized by allowing the business and information technology owners to tag the artifacts they own. By empowering the individuals that best understand identities and access, the most accurate and timely context (tags) are assigned. Subsequently, governance decision makers, that use these tags for context, gain additional insight to support better, more informed decisions.

The tagging of artifacts within an identity management system may thus be driven by a variety of process within the identity management system, including manual or automated process driven by the timing or scheduling of the identity management system, changes to data within the identity management system or related or associated applications, or calls or requests from external systems (e.g., which may themselves be driven by the elapse of a certain amount of time or changes in associated data). Moreover, tagging of artifacts in one part of the system may function seamlessly with tagging in other parts of an identity management system such that the tags may be used across the identity management system and with any downstream tagging pipelines or related functionality.

In certain embodiments, the tags that are assigned to artifacts may themselves be grouped or categorized. In particular, when a tag is created or at a later point, a tag group or classification may be assigned to the tag (e.g., as a metadata or an attribute of the tag itself). The assignment of groups or classification to tags may, for example, be managed through an interface that allows a tag administrator (e.g., associated with an enterprise) to access and assign these groups or classifications to a tag. In this manner, a group or classification (collectively classification) may be assigned to any tag and those tags (or artifacts associated therewith) managed as a group based on the classification. Prerequisite: Applying the proper tags to the appropriate Identities using the other methods outlined (Search) would be required to support this embodiment. Alternatively, IdentityNow will decentralize this IGA practitioner activity by providing business and IT functions (e.g. Managers, Role Owners, Source Owners) with the ability to tag the Identities and Artifacts they own without engaging IT. This allows the users to gain their access through the actions of the business and IT owners while the system provides governance oversite.

Specifically, the services or applications of (or that utilize) an identity management system may be aware of tag classifications allowing identity management system governance logic to consume these tags and improve programmatic decisions based on this context. With this approach the value of the tags that have been applied may be extended, improving the degree of automation and security allowed by the identity management system, and improving the user experience. For example, governance logic of an identity management system may be aware of designated governance tag groups or classifications. This designation makes governance applications or services of the identity management system aware of these tags or classifications, and logic of these applications or services may utilize the classifications appropriately when managing associated artifacts, including making identity governance workflows and decisions.

As but one example of where such classifications may prove useful is when applying tags that define the security scopes for an enterprise's requestable items (e.g., tags o Finance, Finance_EU, Sales, Sales_EU, M&A, Project_XYZ). A tag classification (e.g., "Access Request Scoping") may be applied to these tags. An access request service of the identity management system can be adapted to consume this tag classification (e.g., the classification "Access Request Scoping") and impose access controls such that request able artifacts are only available to identities (e.g., end users) which share the same tag.

An example of a use case for tags may also be imagined in the separation of duties (SOD) enforcement. For example, a SOD policy artifact within the identity management system may be tagged with a partial high risk tag (e.g., "High_Risk"). The task for remediating this SOD policy's violation would also be tagged as "High_Risk". Similarly, a user artifact associated with a user that is in violation of this SOD policy would be tagged (e.g., as "High_Risk") until they are brought back into compliance. This tag (e.g., "High_Risk") can be used to trigger lifecycle state changes in the identity management system. An artifact (e.g., a "MyTeam" artifact) or the user's manager artifact could also be tagged (e.g., with a "High_Risk"). Applications or services of the identity management system may be driven by such a tag to, for example create a schedule certification evaluation for all users with such a (e.g., "High_Risk") tag. Moreover, task queues within the identity management system may be adapted to sort any tags or artifacts associated with this tag (e.g., "High_Risk") to give them the highest priority. Scheduled reports can be run for all artifacts with the tag (e.g., "High_Risk") to get a collection of such artifacts. Moreover, these tags may be externalized to other systems such that the users tagged (e.g., as "High_Risk") in the identity management system can be similarly tagged in other systems (e.g., in an SSO system to lock/disable account access prohibiting access to key systems).

Accordingly, tags as discussed may be assigned to the identity management artifacts and consequently the identity management artifacts may be grouped, evaluated, searched, processed or otherwise managed using these tags, even in cases where the tags assigned to the identity management artifacts do not originate, or are not associated with, the source systems from which the artifacts were obtained. These tags may also be used to associate, group or manage disparate artifacts. Such tags may even be used to drive subsequent programmatic behavior of the identity management system, including the subsequent of assignment of additional tags to associated identity management artifacts.

To assist in the efficient implementation of the tagging of artifacts and the subsequent use of tags associated with these artifacts, the tags may be indexed in a search index in association with artifacts having those tags. Specifically, embodiments of the identity management systems disclosed herein may utilize a search service that provides an interface for indexing artifacts and association data in a data store and an interface for querying that artifact data. The search service may utilize, for example, a data model for holding identity management data in a denormalized or serialized format in a NoSQL (e.g., such as Elasticsearch) data store along with a specialized query language tailored to searching such denormalized or serialized (collectively denormalized herein) identity management data. Data for identity management data artifacts is stored in objects or documents (collectively referred to as documents herein) according to a denormalized document model for that particular identity management artifact. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the NoSQL data store (e.g., as top level, root, or parent documents). Thus, to index a tag for an identify management artifact, the document for that identity management artifact may be updated with the tag. As such, every tag belonging to an identity management artifact may, in one embodiment, be indexed in the document associated with that identity management artifact.

Embodiments may employ a tagging service (e.g., a microservice) for efficient implementation of the tagging of artifacts. The interface of the tagging service may present an interface through which artifacts may be located. This interface may include, for example, a navigation interface or a search interface. When a search is received through the tagging interface a search may be submitted to the search service through the interface provided by the search service for querying the documents for the identity management artifacts stored in the data store of the search service. The located identity management artifacts can then be returned by search service to the tagging service for presentation through the user interface of the tagging service. Artifacts presented through the interface may be assigned tags by the user. The tagging service may also allow the specification of tagging policies through the definition of search queries and associated tags, artifacts and their associations or otherwise. An artifact can thus be tagged through the tagging service manually by a user using the navigation or search interface or in an automated manner by the application of a tagging policy by a tagging service. Moreover, this tagging, including the search and tagging of artifacts may be accomplished using almost any type of interface offered by the identity management system, including for example, native graphical user interfaces or through an API offered by the identity management system.

When an artifact is tagged a request or message (e.g., an event message) may be sent by the tagging service to the search service (through the interface of the search service) to index the assigned tag in association with the artifact (e.g., in the NoSQL data store). These indexing messages can be received (e.g., atomically or in bulk) by the search service and used to index the tag in the documents for the identity management artifacts in the data store (e.g., using an Application Programming Interface (API) provided by the NoSQL data store).

In one embodiment, the identity management system may employ an aggregator to handle these indexing messages along with messages from one or more additional services that may be utilized by the identity management system. The aggregator may thus be configured with an interface that receives messages from the services of the identity management system and dispatches one or more requests to other components of the identity management systems. In this manner, messages pertaining to the same or associated artifacts may be buffered, merged or orchestrated such that subsequent requests to the other components of the identity management system may be efficiently dispatched. Accordingly, when the aggregator receives a message regarding the tagging of an object, at some point a request to add that tag (e.g., and any associated data) may be sent from the aggregator to the search service to index that tag for that artifact.

These tags can then be used in queries to locate identity management artifacts associated with those tags. As discussed, the search service may additionally provide an interface for querying the documents for the identity management artifacts stored in the data store of the search service. The interface may accept queries formulated according to a search query string syntax that allows queries to be formed whereby the documents of the data store may be queried When constructing the search, the search interface may allow the specification of values for tags. The search service can receive these queries formulated according to the search query string syntax, including such tags, and evaluate the received queries against the document in the data store to determine artifacts to which the tags have been assigned. These artifacts (e.g., associated with the tags of the search query) can then be returned in response to the search.

In one embodiment, an identity management system may include an indexing service, a search service and a tagging service. The indexing service may obtain identity management data from one or more source systems in a distributed enterprise computing environment where the identity management data comprises data on a set of identity management artifacts utilized in identity management in the distributed enterprise computing environment. The search service may maintain a search index for the identity management artifacts, the search index comprising a document for each of the identity management artifacts. The tagging service can determine a first set of the identity management artifacts, obtaining a first tag to associate with the first set of the identity management artifacts and communicate with the search service to index the first tag in the search index in association with each of the first set of identity management artifacts substantially in real-time. This indexing may include determining the document for each of the first set of identity management artifacts by the search service, and storing the first tag in each of the documents for each of the first set of identity management artifacts, thereby allowing the first set of identity management artifacts to be searched using the first tag and the search index.

In certain embodiments, the tagging service may also allow the definition of a first tagging policy comprising a saved search and a second tag. The tagging policy can be executed at a time interval by executing the saved search using the search service to determine a second set of identity management artifacts resulting from the saved search and communicating with the search service to index the second tag in the search index in association with each of the second set of identity management artifacts. The indexing of the second tag in association with the each of the second set of identity management artifacts may also comprise the search service determining the document for each of the second set of identity management artifacts and storing the second tag in each of the documents for each of the second set of identity management artifacts, thereby allowing the second set of identity management artifacts to be searched using the corresponding tag and the search index.

In some embodiments the tagging service may allow the definition of a second tagging policy comprising a first artifact type, an association and a second artifact type. The tagging service can determine that the association has been made between a first identity management artifact of the first artifact type and a second identity management artifact of the second artifact type and determine a third tag associated with the first identity management artifact. The tagging service can communicate with the search service to index the third tag in the search index in association the second identity management artifact, wherein indexing the third tag in association with the second identity management artifact comprises the search service determining the document for the second identity management artifact and storing the third tag in the document for the second identity management artifact, thereby allowing the second identity management artifact to be searched using the third tag and the search index. In a particular embodiment, determining the first set of identity management artifacts comprises searching the set of identity management artifacts based on a search criteria using the search service. This search criteria may include any number of tags.

Embodiments thus provide numerous advantages over previously available systems and methods for managing or searching identity management data. Some of these advantages relate to the ability of embodiments to allow users to take advantage and use such tags without engaging in expensive and technically complex implementation problems such as the reconfiguration or rebuilding of data tables, schemas or formats. In particular, as embodiments are based on particular models of identity management data and artifacts thereof, the identity management data may be stored and indexed (e.g., as documents in a NoSQL data store such as Elasticsearch) in a manner that may be updated on a substantially real-time basis. Thus, the use of tags in embodiments as disclosed may be extendable without user involvement and the tags added may be substantially immediately used (e.g., indexed and searchable) substantially in real-time as the tags are added.

Moreover, as tags may be assigned by almost any user and may utilize any terms, embodiments may allow the assignment of tags by users that are closest to the data itself and using the terms and nomenclature relevant to the users or the enterprise (e.g., as opposed to constructs imposed upon them by the source systems of the identity management systems themselves). Such abilities allow users to manage, search and use identity management data even when they are not experts in the field of identity management. Thus, information owners (e.g., individuals outside of IT that have valuable information that do not typically have access to administer program's software) have the methods, systems, and apparatus to create and manage context via tags, including the application of programmatic identity governance processes to the enterprise's context (e.g., as expressed in user defined tags).

This data can subsequently be made available to manual, automated, and machine learning decisions, and workflows. This data may only need be stored or indexed once. It can be stored for the life of the governance asset or until the information owner modifies it. Additionally, the accuracy, consistency, scale, and speed of governance decisions increase through access to this information.

Additionally, as embodiments are based on particular models of identity management data and artifacts thereof (e.g., as represented in the documents of a NoSQL data store) the identity management data may be queried using embodiments of a specialized syntax that provide the ability to query such nested documents. The ability to store and query identity management data represented in this fashion may allow more intuitive access to such identity management data and may yield deeper and more relevant insights into such data for users of identity management systems as an outgrowth of the accuracy and granularity or precision of the queries allowed, and the results produced, by embodiments as disclosed.

Moreover, embodiments as disclosed may offer the technological improvement of reducing the computational burden and memory requirements of systems implementing these embodiments through the improved data structures, query language and query formulation implemented by such embodiments. Accordingly, embodiments may improve the performance and responsiveness of identity management systems that utilize such embodiments of these types of data models and searches by reducing the computation time and processor cycles required to implement such searches (e.g., and thus improving processing speed) and simultaneously reducing memory usage or other memory requirements. Additionally, embodiments may offer dynamic data models that enable flexible search in an end user oriented fashion.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 3, 4, 5A, 5B, 6A, 6B and 7 are depictions of examples of interfaces that may be used by embodiments of an identity management system.

DETAILED DESCRIPTION

Figure 1:
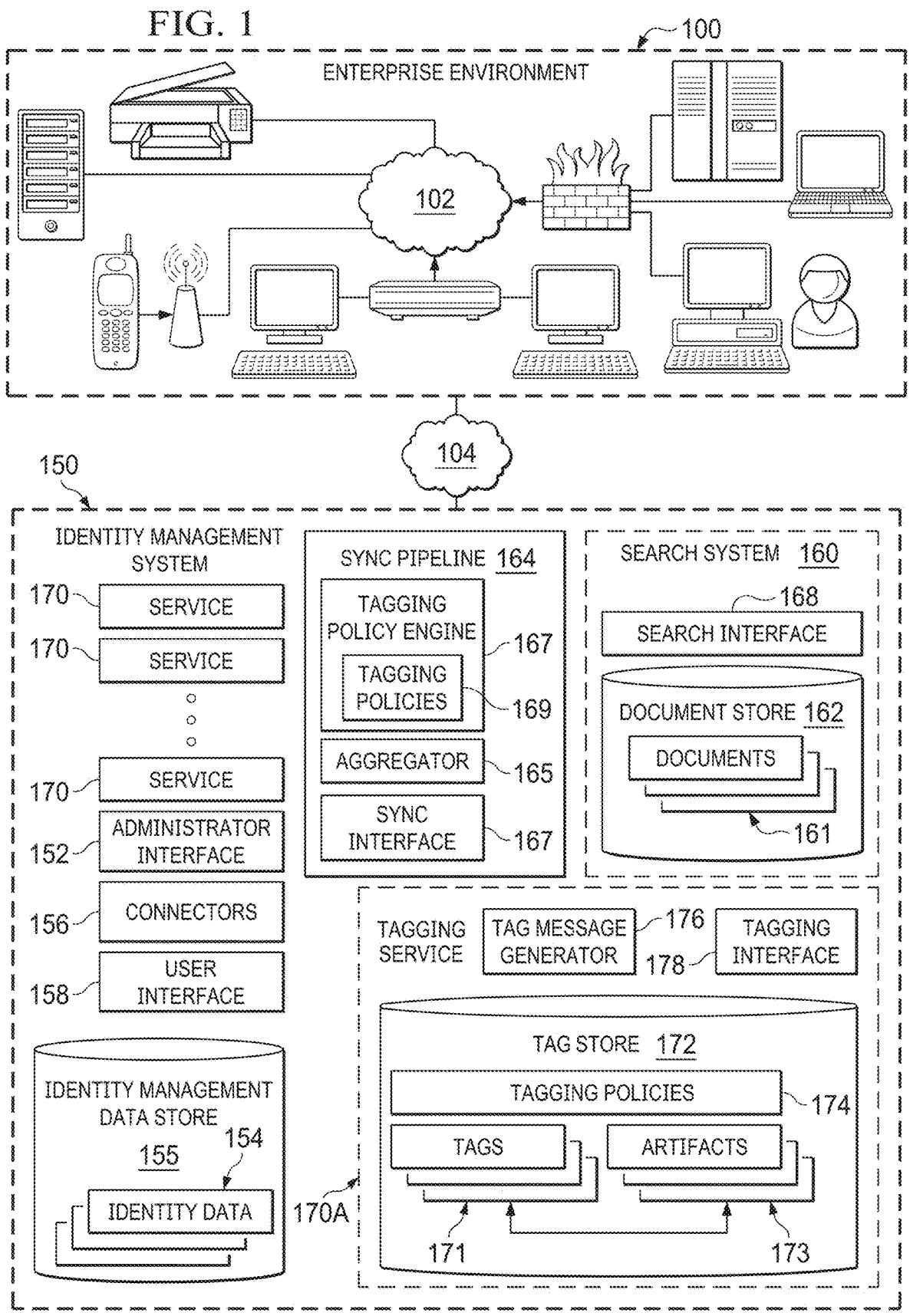
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these examples of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements.

These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

It would therefore be desirable for identity management solutions to offer the capability for the provisioning of detailed and relevant contextual identity governance information for an enterprise. This desire is prevalent at least because within the IG space today, the best approaches to providing any sort of useful context are manual, ad hoc, and error prone (e.g., not repeatable with consistent outcomes). To ameliorate these issues, among others, embodiments of the identity management systems disclosed herein may support the creation, association, searching (e.g., querying), or visualization of relevant context to IG artifacts through the use of tags. These tags may then be utilized for a variety of purposes, including in the identity management systems' manual (e.g., user involved), automated, or machine learning, decisions, processes, or workflows.

In particular, identity management systems as disclosed may obtain data on identity management artifacts (e.g., such as an identity, entitlement, role, event, access profile or account activity) such that these artifacts may be associated and managed accordingly. These artifacts may be imported or determined from data obtained from a set of source systems within an enterprise. Embodiment of an identity management system may allow tags to be assigned or otherwise associated with these managed identity management artifacts, where these tags may be assigned via a manual (e.g., user involved) process or an automated process (e.g., such that tags may be assigned in a substantially programmatically or automated fashion through the operation of the identity management system itself). These designations (e.g., tags) are not restricted by the sources (e.g., from the identity management artifact was obtained) or indeed even the constructs of the identity management system itself. Accordingly, such tag assignments may be virtually unconstrained. The tags assigned may thus reflect a particular user's insight, view or knowledge of particular identity management artifacts and may additionally reflect that user's nomenclature (e.g., the nomenclature reflecting the context of the user, the user's groups, the enterprise to which the user belongs, etc.).

Turning then to FIG. 1, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100, which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user to define one or more identity management artifacts such as an identity, entitlement, role, event, access profile or account activity, and associate these defined identity management artifacts using, for example, an administrator interface 152. For example, defined identities may be associated with entitlements or roles. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a function within the distributed networked enterprise computer environment 100, including, for example, accessing computing systems, applications, file systems, physical locations, particular data or data items, networks, subnetworks or network locations, etc. Entitlements may also define the actions a user can take with respect to that access. Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designates the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

The identity management system 150 can store identity management data 154 in an identity management data store 155. This identify management data store 155 may be, for example, a relational data store, including SQL based data stores such as a MySQL database or the like. The identity management data 154 stored may include a set entry, each entry corresponding to an identity management artifact as discussed. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity. In one embodiment, the identity management data 154 for an artifacts (e.g., identity) can be stored in a cube (e.g., "Identity Cube") where all identity management data 154 associated with a particular artifact (e.g., for an identity all of their accounts from all data sources, and all attributes and entitlements of those accounts) may be associated.

As another example, the identity management data 154 may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally preform identity management with respect to enterprise environment 100.

As part of a robust identity management system, it is thus desirable to effectively search the identity management data 154 associated with an enterprise 100. Specifically, it is desired to provide an identity management system with effective ways to store, index and search such identity management data to increase the efficacy of search of identity management data at least by speeding the searching of such identity management data and improving the results of this searching. Identity management system 150 may thus include search system 160 having an identity management document store 162. This identity management document store (or just document store) 162 may, in one embodiment, be a NoSQL data store designed to index, store, access, retrieve and search documents 161 such as, for example, Elasticsearch, MongoDB, Azure Cosmos or the like. The document store 162 may thus include an interface (e.g., a REpresentational State Transfer (REST) API or the like) whereby requests for the indexing, access or searching of documents 161 may be sent through the interface.

Search system 160 may store data included in, or derived from, identity management data 154 in the document store 162 using such an interface. Specifically, in certain embodiments, the search system 160 may be in communication with a sync pipeline 164. The sync pipeline 164 may access the identity management data 154 and evaluate the identity management data 154 of the relational data store to transform the identity management data 154 stored therein into documents according to the denormalized document model for identity management artifacts. The sync pipeline 164 can then generate messages for indexing and storing these documents in the document store 162 and send the indexing messages to the search service 160 either atomically or in bulk.

In one embodiment, sync pipeline 164 may include an aggregator 165. The aggregator 165 may at some time interval, receive updates from, or query, the identity management data store 154 to identify which artifacts have been created, updated, and deleted. The aggregator 165 can also query the identity management data 154 to determine data associated with those artifacts. Additionally, the sync pipeline 164 may include a sync interface 167 through which indexing messages (e.g., events) may be received from various services 170 employed by the identity management system 150 (e.g., when those services have data they wish to be indexed in documents 161 in document store 162).

Based on the artifacts the sync pipeline can and assembles a sync message (e.g., an indexing message) for one or more artifacts (e.g., a message for creating, updating or deleting a document 161 corresponding to that artifact in the document store162). In one embodiment, the aggregator 165 may serve to buffer, merge or orchestrate determined data, received indexing messages or the sending of sync messages such that requests (e.g., sync or indexing messages) to the other components (e.g., the document store 162) of the identity management system may be efficiently dispatched while still maintaining substantially real-time updates to the documents 161 in the document store 162.

These indexing messages can be received by the document store 162 and used to index the data for documents 161 for the identity management artifacts in the data store 162. The documents 161 in the data store may thus represent the identity management artifacts of the enterprise 100 according to a nested denormalized document model. There may thus be a document for each artifact (e.g., identity, entitlement, role, event, access profile, account activity, etc.) associated with the enterprise environment 100. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the document data store 162 (e.g., as top level, root, or parent documents).

As an example of identity management data that may be obtained from an identity management system, the following is one example of a Javascript Object Notation (JSON) object that may relate to an identity:

```
{
    "attributes": {
        "Department": "Finance",
        "costcenter": "[R01e, L03]",
        "displayName": "Catherine Simmons",
        "email": "Catherine.Simmons@demoexample.com"
        "empId": "1b2c3d",
        "firstname": "Catherine",
```

-continued

```
    "inactive": "false",
    "jobtitle": "Treasury Analyst",
    "lastname": "Simmons",
    "location": "London",
    "manager": "Amanda.Ross",
    "region": "Europe",
    "riskScore": 528,
    "startDate": "12/31/2016 00:00:00AM UTC",
    "nativeIdentity_source_2": "source_2",
    "awesome_attribute_source_1": "source_1",
    "twin_attribute_a" : "twin a",
    "twin_attribute_b" : "twin b",
    "twin_attribute_c" : "twin c"
  },
  "id": "2c9084ee5a8de328015a8de370100082",
  "integration_id": "iiq",
  "customer_id": "ida-bali",
  "meta": {
    "created": "2017-03-02T07:19:37.233Z",
    "modified": "2017-03-02T07:24:12.024Z"
  },
  "name": "Catherine.Simmons",
  "refs": {
    "accounts": {
      "id": [
        "2c9084ee5a8de328015a8de370110083"
      ],
      "type": "account"
    },
    "tags": [
        {
          "id":
          "2c9084ee5a8ad545345345a8de370110083",
            "name" : "SOD-SOX",
              "type": "TAG"
        },
        {
          "id":
          "2c9084ee5a8ad545345345a8de370122093",
            "name" : "PrivilegedAccess",
              "type": "TAG"
        },
    ]
    "entitlements": {
      "id": [
        "2c9084ee5a8de328015a8de449060e54",
        "2c9084ee5a8de328015a8de449060e55"
      ],
      "type": "entitlement"
    },
    "manager": {
      "id": [
        "2c9084ee5a8de022015a8de0c52b031d"
      ],
      "type": "identity"
    }
  },
  "type": "identity"
}
```

As another example of identity management data that may be obtained from an identity management system, the following is one example of a JSON object that may relate to an entitlement:

```
{
  "integration_id": "bd992e37-bbe7-45ae-bbbf-c97a59194cbc",
  "refs": {
    "application": {
      "id": [
        "2c948083616ca13a01616ca1d4aa0301"
      ],
      "type": "application"
    }
  },
```

-continued

```
  "tags": [
    {
      "id":
      "2c9084ee5a8ad545345345a8de370110083"
        "name" : "SOD-SOX",
          "type": "TAG"
    },
    {
      "id":
      "2c9084ee5a8ad545345345a8de370122093"
        "name" : "PrivilegedAccess",
          "type": "TAG"
    },
  ]
  "meta": {
    "created": "2018-02-06T19:40:08.005Z",
    "modified": "2018-02-06T19:40:08.018Z"
  },
  "name": "Domain Administrators",
  "attributes": {
    "description": "Domain Administrators group on
    Active Directory"
    "attribute": "memberOf",
    "aggregated": true,
    "requestable": true,
    "type": "group",
    "value": "cn=Domain Administrators,dc=domain,dc=local"
  },
  "id": "2c948083616ca13a01616ca1f1c50377",
  "type": "entitlement",
  "customer_id": "3a60b474-4f43-4523-83d1-eb0fd571828f"
}
```

Other examples are presented in the attached Appendix.

Search system 160 may thus offer an interface 168 through which the documents in the data store 162 may be queried. This interface may allow queries to be submitted where the queries may be formulated according to a search query string syntax that allows the querying of nested documents (or data in nested documents) of the data store 162. The interface 168 may also allow "free text" search queries to be submitted, thus allowing for searching the documents in the data store 162 without prior knowledge about which field or fields to look in, or even what fields the documents may contain. Moreover, the interface 168 may offer the ability for the user to save such search queries such that they may be executed at a later point or at some time interval to return results or, for example, to raise a notification or an alarm, or for proactive governance actions on query results. The query syntax used for such queries may provide query operators that allow specification of nested keywords or terms to be searched. This query syntax may be an extension, or be otherwise based on, a query syntax offered by data store 162. For example, in one embodiment, the query syntax may be an extension of the Elastic Lucene based Query String syntax that allows the ability to query nested documents.

The search interface 168 can receive these queries, formulated according to the search query string syntax, and may evaluate the received queries to extract nested search expressions (e.g., expressions of a search query related to nested documents). In one embodiment, for example, the search interface 168 may lex and parse the query string to extract nested queries identified by the nested query operators specified in the query syntax. The search interface 168 can then examine the structure of the hierarchy to arrange the terms of the received query and form then a query expression native to the NoSQL data store (e.g., expressed in a format according to a search API offered by the NoSQL data store) representing the received query, wherein the native query expression reflects the nesting of the originally received query. For example, the query may be formed according to the Elastic Search Query DSL Boolean syntax. The native query expression can then be submitted to the NoSQL data store 162 using the interface (e.g., API) of the NoSQL data store. The documents returned by the NoSQL data store 162 in response to the submitted search (or identifiers or portions thereof) can then be returned to the user.

As can be seen, the ability to query identity management data in a quick and powerful manner may prove quite useful to users of these types of identity management systems. However, as discussed, the ability to query and organize artifacts in the identity management system 150 may be hampered by the taxonomy or lexicography offered by the source systems within the enterprise environment 100. Specifically, if the only data that is indexed in the documents 161 in document store 162 representing the artifacts is data that is provided or obtained from these source systems, then only the taxonomy or lexicography utilized by those source systems may be utilized to search such artifacts, even when such terms are unrelated to identity governance or the terms that the enterprise 100 itself might employ.

It is desirable therefore, to offer the capability for the provisioning of detailed and relevant contextual identity governance information for an enterprise. Embodiments of the identity management systems disclosed herein may thus include tagging service 170a to support the creation, association, searching (e.g., querying), or visualization of relevant context to IG artifacts through the use of tags. These tags may then be utilized for a variety of purposes, including in the identity management systems' manual (e.g., user involved), automated, or machine learning, decisions, processes, or workflows.

In one embodiment, the tagging service 170a may include a tagging interface 178. The interface 178 of the tagging service 170 may present an interface through which artifacts may be located. This interface may include, for example, a navigation interface or a search interface. When a search (e.g., according to the querying language as discussed) is received through the tagging interface 178 the search may be submitted to the search system 160 through the interface 168 provided by the search system 160 for querying the documents 161 for the identity management artifacts stored in the data store 162 of the search system 168. The located identity management artifacts can then be returned by search service 160 to the tagging service 170a for presentation through the user interface 178 of the tagging service 170a. The interface 178 may then offer the ability for users to assign tags to the artifacts presented through the tagging interface 178. Additionally, in certain embodiment, to facilitate understanding of the tags (e.g., by users or by automated process implemented in the identity management system 150) the tagging interface 168 may allow a user to specify metadata in association with such tags.

The interface 178 may also allow the specification of tagging policies 174. These tagging policies may be evaluated in an automated manner (e.g., at a time period that may be configured by a system administrator or user, etc. and which may be on a policy by policy basis or otherwise) by the tagging service 170a to tag artifacts according to the policy 174. For example, a tagging policy 174 may comprise a saved search and one or more corresponding tags. The tagging policy 174 may be executed on a time period basis by the tagging service 170a (e.g., every hour, every day, etc.) by executing the search of the policy 174 to determine the set of artifacts resulting from the search and applying the corresponding tags of the policy to the resulting artifacts. In this manner, tags can be automatically associated with artifacts that are currently managed by the identity management system and may also be applied to future artifacts that may be determined or added to the identity management system 150 (e.g., imported or added from source systems within the enterprise).

Moreover, tagging policy 174 may specify the automatic tagging of an artifact with tags from another artifact based on a specified association between the two artifacts. For example, a tagging policy 174 may specify that any identity artifact should be assigned the tags of any entitlement artifact for which that identity artifact has been granted access (e.g., through an access request). Accordingly, if an identity artifact is granted access to an entitlement with a particular tag (e.g., "highly privileged") that identity artifact may be assigned that tag as well (e.g., assigned the "highly privileged" tag). In this way tags may be automatically propagated between artifacts based on the occurrence of an event specified in the tagging policy 174.

In a similar manner, a tagging policy 174 may also be used to govern the visibility of identity management data or artifacts themselves. For example, a tagging policy 174 may specify that only identity management artifacts (e.g., identities or roles) associated with a certain tag (e.g., "highly privileged") may (or may not) access identity management data associated with another (or the same) tag (e.g., "confidential"). As the tags assigned to artifacts may be virtually unconstrained and may reflect a particular user's insight, view or knowledge, such tagging policies may allow a user to drive the configuration of various identity governance processes through subject matter context (e.g., the tags) that is pertinent to them. Additionally, these types of tagging policies may enable domain users to specify which access is needed by which individuals without engaging an expert user such as the IT department of the enterprise.

When an artifact is tagged (e.g., a user manually tagging an artifact or as the result of an evaluation of a tagging policy 174), the tagging service 170a can determine if the tag is stored in tag store 172. The tag store 172 may include a tag table 171 and an artifact table 173. The tag table 171 may include an entry for each tag, the entry having the tag itself, a unique identifier (e.g., numerical or alphanumerical) and a metadata or other related data (e.g., flags) associated with the tag. The artifact table 173 may thus include entries having associations between a tag (e.g., as specified by the identifier for the tag) and one or more artifacts that have been assigned (or "tagged with") that tag. Thus, if the tag assigned is not in the tag store 172 when it is assigned an entry in the tag store 171 may be created for the assigned tag and the artifacts table 172 updated to indicate the association between that tag and the artifacts to which it has been assigned.

At some point then, tag message generator 176 may send a message (e.g., an indexing message) to the search service 160 to index the assigned tag in association with the artifact (e.g., in the document data store 162). These indexing messages can be received (e.g., atomically or in bulk) by the search system 160 and used to index the tag in the documents 161 for the identity management artifacts in the data store 162.

At this point then, that tag and artifact association is available to be searched thorough search interface 168. Specifically, these tags can be used in queries to locate identity management artifacts associated with those tags. As discussed, the search system 160 may provide an interface 168 for querying the documents 161 for the identity management artifacts stored in the data store 162 of the search service 160. The interface 168 may accept queries formulated according to a search query string syntax that allows queries to be formed whereby the documents of the data store may be queried. When constructing the search, the search interface 168 may allow the specification of values for tags. The search service 168 can receive these queries formulated according to the search query string syntax, including such tags, and evaluate the received queries against the document 161 in the data store to determine artifacts to which the tags have been assigned. These artifacts (e.g., associated with the tags of the search query) can then be returned in response to the search.

As it is desirable to offer the capability for the provisioning of this detailed and relevant contextual identity governance information (e.g., tags) for an enterprise, embodiments of an identity management system 150 may also be adapted to assign tags as artifacts are created or updated within the identity management system 150. Accordingly, in one embodiment, sync pipeline 164 may include tagging policy engine 166 configured with one or more tagging policies 169 to support the creation, association, searching (e.g., querying), or visualization of relevant context to artifacts through the use of tags. These tags may then be utilized for a variety of purposes, including in the identity management systems' manual (e.g., user involved), automated, or machine learning, decisions, processes, or workflows, similarly to those discussed.

Specifically, in one embodiment tagging policy engine 166 may assign tags to artifacts as identity management data 154 associated with those artifacts is transformed into documents 161 according to the denormalized document model for identity management artifacts. Thus, tagging policies 169 may be defined so that appropriate tagging of artifacts occurs immediately when the artifact is initially created or updated within the identity management system 150 or as documents representing the artifact are created or updated in document store 162. This ensures the state of an artifact and its tags are persisted and synchronized before the downstream governance policies are evaluated. By tagging these artifacts as they are initially created or updated, embodiments of the identity management system may provide subsequent governance workflows or decision points the ability to consume these tags as additional context to improve automated or manual governance decisions. These tags also become available to other aspects of an identity management system, such as artificial intelligence components, to improve security.

A tagging policy 169 may comprise a policy definition including a combination or composite of data (e.g., attributes of the artifact) and one or more associated tags. The tagging definition for a tagging policy may be an expression (e.g., a Boolean or other type of expression) based on almost any type or combination of the data available in the data obtained from the source systems or utilized by the identity management system, including, for example, identity or account attributes, source or entitlement information, existing access rights. Thus, such tagging policy definitions may provide fine grained control of tagging.

As artifacts are created or updated the tagging policies 169 may be evaluated for the created or updated artifacts by evaluating the tagging definition using the data associated with the created or updated artifact. If the tagging definition is true (or false) for an artifact, the artifact may be tagged with the associated tags for the tagging policy. Specifically, a tagging message or request may be sent from the tagging policy engine 166 to the tagging service 170a identifying the artifact and the tag to be assigned for that artifact. The tagging service 170a can then update the tag store 172, including the tag table 171 or artifact table 173 to associate the tag with the artifact to indicate the association between that tag and the artifacts to which it has been assigned, as has been discussed.

In one embodiment, a tagging policy 169 may also have a portion including a cascade policy definition. The cascade definition for a tagging policy may specify if any other artifacts associated with the artifact being evaluated should be tagged with the tag specified by the tagging policy (or another tag) based upon that artifact's association with the artifact being evaluated against the tagging policy. Thus, a cascade definition may itself have a specified relationship and an associated tag. When the artifact being evaluated meets the tagging definition of the tagging policy 169 and is tagged, the cascaded definition can be evaluated to determine if any related artifacts should be tagged with the tag of the cascade policy definition. If any other artifact meets the relationship specified in the cascade definition those other artifacts may be tagged with the tag of the cascade definition (e.g., a tagging message or request may be sent from the tagging policy engine 166 to the tagging service 170a identifying the artifact and the tag to be assigned for that artifact). Such a cascade definition may be recursively applied such that for each other artifact identified as meeting the relationship specified in the cascade definition, it can be determined if other artifacts meet the cascade definition and should be tagged, and so on.

In this manner, artifacts may be associated with tags in the tag store 172 in an automated manner upon creation or update of those artifacts (e.g., as the artifact is processed through the sync pipeline 164 or otherwise created or update). As these artifacts have been updated with tags in the tag store 172, the tag message generator 176 may send a message (e.g., an indexing message) to the search service 160 to index the assigned tag in association with the artifact (e.g., in the document data store 162). These indexing messages can be received (e.g., atomically or in bulk) by the search system 160 and used to index the tag in the documents 161 for the identity management artifacts in the data store 162. At this point then, that tag and artifact association is available to be searched thorough search interface 168, as discussed. Additionally, as artifacts may be associated with tags in the tag store 172, the tagging policies 174 of the tagging service 170a may likewise be applied to these artifacts.

As can be seen, by using embodiments of a tagging service the tags assigned are not scoped to a particular type of artifact, but instead may be applied across artifacts regardless of their type. Moreover, tags may be added to artifacts without any knowledge of the underlying representation of such artifacts or the reconfiguration of any data representations of such artifacts. Thus, embodiments allow users to take advantage and use such tags without engaging in expensive and technically complex implementation problems such as the reconfiguration or rebuilding of data tables, schemas or formats. In particular, as embodiments are based on particular models of identity management data and artifacts thereof, the identity management data may be stored and indexed (e.g., as documents in a NoSQL data store such as Elasticsearch) in a manner that may be updated on a substantially real-time basis. Thus, the use of tags in embodiments as disclosed may be extendable and the tags added may be substantially immediately used (e.g., indexed and searchable) substantially in real-time as the tags are added.

Moreover, as tags may be assigned by almost any user and may utilize any terms, embodiments may allow the assignment of tags by users that are closest to the data itself and using the terms and nomenclature relevant to the users or the enterprise (e.g., as opposed to constructs imposed upon them by the source systems of the identity management systems themselves). These types of abilities allow users to manage, search and use identity management data even when they are not experts in the field of identity management. Accordingly, information owners (e.g., individuals outside of IT that have valuable information that do not typically have access to administer program's software) have the methods, systems, and apparatus to create and manage context via tags, including the application of programmatic identity governance processes to the enterprise's context (e.g., as expressed in user defined tags).

Figure 2:
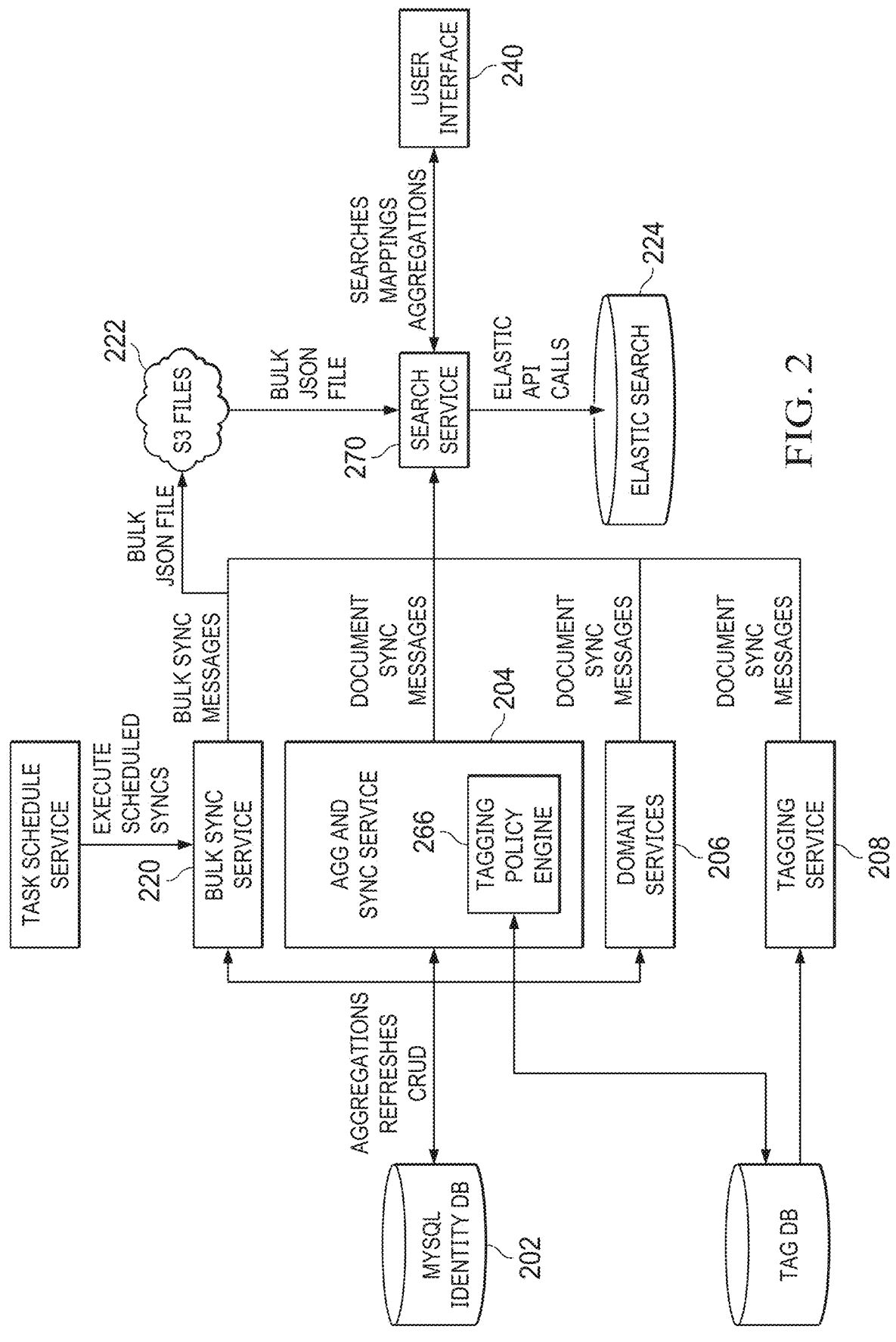
FIG. 2 is a block diagram of an architecture of a search system of an identity management system that is adapted to index and search by tags.

Moving now to FIG. 2, one embodiment of an architecture for implementing the indexing of data related to identity management artifacts, including tags for such artifacts, is depicted. Here, the artifact database 202 may be a relational database that stores artifacts and related data including, for example, identities, entitlements, roles, access profiles, accounts, applications, account activity, or events. The data in this database 202 may be aggregated from multiple sources (e.g., source systems) within an enterprise and may be obtained through connectors that work with such sources systems, including but not limited to Active Directory, Workday, Salesforce, HR systems, JDBC, and many other systems. As discussed, in some embodiments, these source systems may provide accounts or entitlements that are correlated into identity cubes representing a unified identity view of disparate sources.

Whenever an aggregation or artifact refresh occurs (e.g., based on some time period), sync service 204 may be called by the identity management system to query artifact database 202 to identify which artifacts have been, or which should be, created, updated, and deleted. The sync service 204 then assembles a JSON sync document by reading the artifact data and making subsequent queries to any related tables need to obtain data for the artifact, including for example, entitlements, roles, access profiles, accounts or applications. In one embodiment, the sync service 204 may maintain a document for each artifact, thus a hash may be calculated for a document for the artifact and compared against a previous hash stored in for the artifact. If the hashes are different (e.g., indicating changes have occurred for the document for the artifact) then the document for the artifact is then transformed into a document suitable for indexing into the search index and sent in an indexing message to the search service 270.

Sync service 204 may also include tagging policy engine 266 configured with one or more tagging policies to support the creation, association, searching (e.g., querying), or visualization of relevant context to artifacts through the use of tags. Tagging policy engine 266 may assign tags to artifacts as these artifacts are created, updated, or deleted by sync service 204. These tags can be associated with an artifact through communication with tagging service 208.

In addition to the sync service 204, various domain services 206 exist for different types of artifacts including for example, identities, entitlements, provisioning, sources, and access profiles. When changes occur including creates, updates, and deletes to these artifacts indexed in the search service, the respective domain service 206 creates a JSON sync document to index the data related to that artifact and send an indexing message with the indexing data to the search service 204 for indexing of the data.

Similarly, a tagging service 208 is provided. When a tag is associated with an artifact (e.g., as described above), the lagging service 208 creates a JSON sync document to index the data related to that artifact and send an indexing message with the indexing data to the search service 270 for indexing of the data.

In one embodiment, the bulk sync service 220 provides an alternate way to synchronize data from the artifact database 202. The bulk sync service 220 takes a query specifying what data and criteria to include in the sync and also a transformer specifying how to build and transform the sync objects from the queried data. This bulk sync service 220 runs the query and transforms one or more artifacts into a file (e.g., a JSON file) and uploads into a file store 222 such as an AWS S3 file store. A message is then sent from the bulk sync service 220 to the search service 270. Based on the reception of this request, the search service 270 may download the file from the file store 222 and index the documents included in the downloaded file into the document store 224 (e.g., the search index). The document store 224 may be, for example, an Elasticsearch document store providing an Elasticsearch interface. The search service 270 can, for example, be configured to execute bulk syncs using the bulk sync service 220 on a scheduled interval for different types of artifacts. This search service 270 can also specify other syncing parameters, such as to only sync data changed after a certain date.

The search service 270 may be the main access point to the document index store 224. The search service 270 may handle the creation, updates, configuration, and maintenance of the indices in the data store 224 (e.g., the Elasticsearch cluster) including an index mapping schema defining how to index documents (e.g., received through indexing requests or in the bulk sync mechanism). Examples of such mapping schemas are provided in the Appendix herein. The search service 270 can batch the documents received and route them to the appropriate index.

The search service 270 also provides interfaces to allow for searching of the documents, aggregation queries on the documents, and provides a description of the index mappings to, for example, power search query autocomplete functionality. The search service 270 may allow for search queries to be saved and shared and also provides the ability to schedule searches to be run and results to be emailed to subscribers.

Accordingly, user (or internal) interfaces 240 for the identity management system may call the search service 270 to execute queries and obtain or display the results. These interfaces rely on the search service 270 to return a mapping of the queryable attributes to provide search query autocomplete. In one embodiment, the user interface may send queries to the search service 206 in a modified Elastic Search lucene query syntax that has been extended to allow simple searching of nested documents in the document store 224. In this manner, all These tags can then be used in queries to locate identity management artifacts associated with those tags. As discussed, the search service may additionally provide an interface for querying the documents for the identity management artifacts stored in the data store of the search service. The interface may accept queries formulated according to a search query string syntax that allows queries to be formed whereby the documents of the data store may be queried.

When constructing the search, the search interface may allow the specification of values for tags. The search service can receive these queries formulated according to the search query string syntax, including such tags, and evaluate the received queries against the document in the data store to determine artifacts to which the tags have been assigned. These artifacts (e.g., associated with the tags of the search query) can then be returned in response to the search.

Embodiments thus provide numerous advantages over previously available systems and methods for managing or searching identity management data. Some of these advantages relate to the ability of embodiments to allow users to take advantage and use such tags without engaging in expensive and technically complex implementation problems such as the reconfiguration or rebuilding of data tables, schemas or formats. In particular, as embodiments are based on particular models of identity management data and artifacts thereof, the identity management data may be stored and indexed (e.g., as documents in a NoSQL data store such as Elasticsearch) in a manner that may be updated on a substantially real-time basis. Thus, the use of tags in embodiments as disclosed may be extendable without user involvement and the tags added may be substantially immediately used (e.g., indexed and searchable) substantially in real-time as the tags are added.

Moreover, as tags may be assigned by almost any user and may utilize any terms, embodiments may allow the assignment of tags by users that are closest to the data itself and using the terms and nomenclature relevant to the users or the enterprise (e.g., as opposed to constructs imposed upon them by the source systems of the identity management systems themselves). Such abilities allow users to manage, search and use identity management data even when they are not experts in the field of identity management. Thus, information owners (e.g., individuals outside of IT that have valuable information that do not typically have access to administer program's software) have the methods, systems, and apparatus to create and manage context via tags, including the application of programmatic identity governance processes to the enterprise's context (e.g., as expressed in user defined tags).

This data can subsequently be made available to manual, automated, and machine learning decisions, and workflows. This data may only need to be stored or indexed once. It can be stored for the life of the governance asset or until the information owner modifies it. Additionally, the accuracy, consistency, scale, and speed of governance decisions increase through access to this information.

It may now be useful to discuss embodiments of the tagging and searching of such identity management artifacts. FIGS. 3-9 depict examples of interfaces that may be implemented by an identity management storage system to allow a user to tag identity management artifacts, search identity management artifacts based on such tags, or otherwise search or manage artifacts. Referring first to FIG. 3, one embodiment of a search interface is presented that allows a user to enter a search query in the search portion 302 of the interface. Results may be returned in a results portion 320 of the interface. These results may be individually selected (or all results selected) using check boxes associated with each resulting artifact. The interface also offers a tag icon 310 that may be selected by a user to tag resulting artifacts returned in response to a search entered into the search portion 302 of the interface. Here, for example, the user has searched for roles in the search portion 302 and had 200 results returned, 6 of which are currently displayed in the results portion 320 of the interface. The user has selected three of the displayed roles using the check boxes associated with those resulting artifacts.

Figure 4:
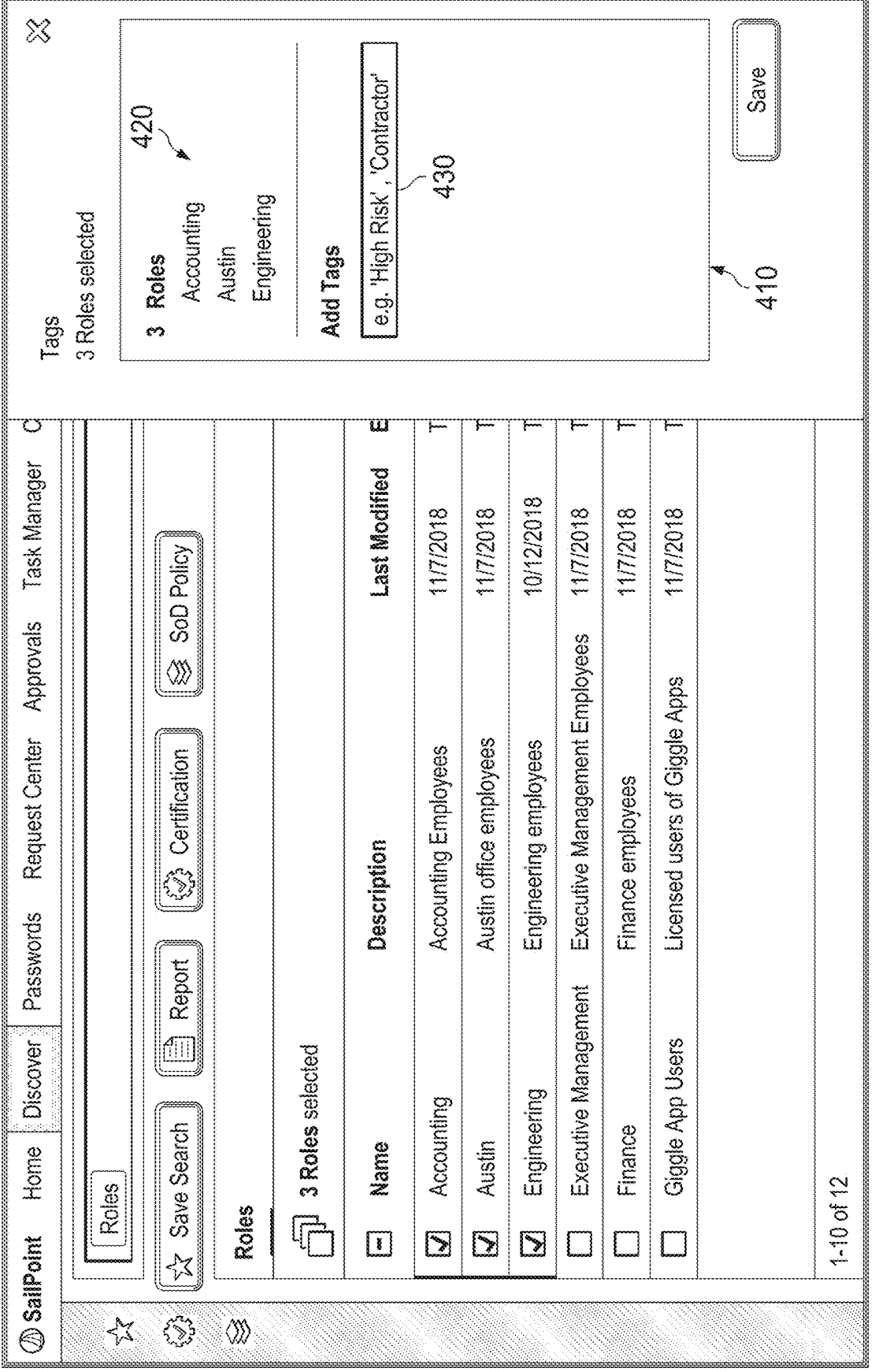

Moving to FIG. 4, when a user selects the tagging icon 310 a tagging portion 410 of the interface may be displayed.

This tagging portion 410 may be adapted to allow a user to add or associate tags with the selected artifacts (e.g., artifacts selected using the check boxes associated with the artifacts as depicted in FIG. 3). Specifically, the tagging portion 410 may present the previously selected artifacts 420 (e.g., in this example the 3 Roles "Accounting", "Austin" and "Engineering") and present a text box 430 for the use to enter tags to be associated with those artifacts. These designations (e.g., tags) are not restricted by the sources (e.g., from the identity management artifact was obtained) or indeed even the constructs of the identity management system itself. Accordingly, such tag assignments may be virtually unconstrained. The tags assigned may thus reflect a particular user's insight, view or knowledge of particular identity management artifacts and may additionally reflect that user's nomenclature (e.g., the nomenclature reflecting the context of the user, the user's groups, the enterprise to which the user belongs, etc.).

Figure 5A:
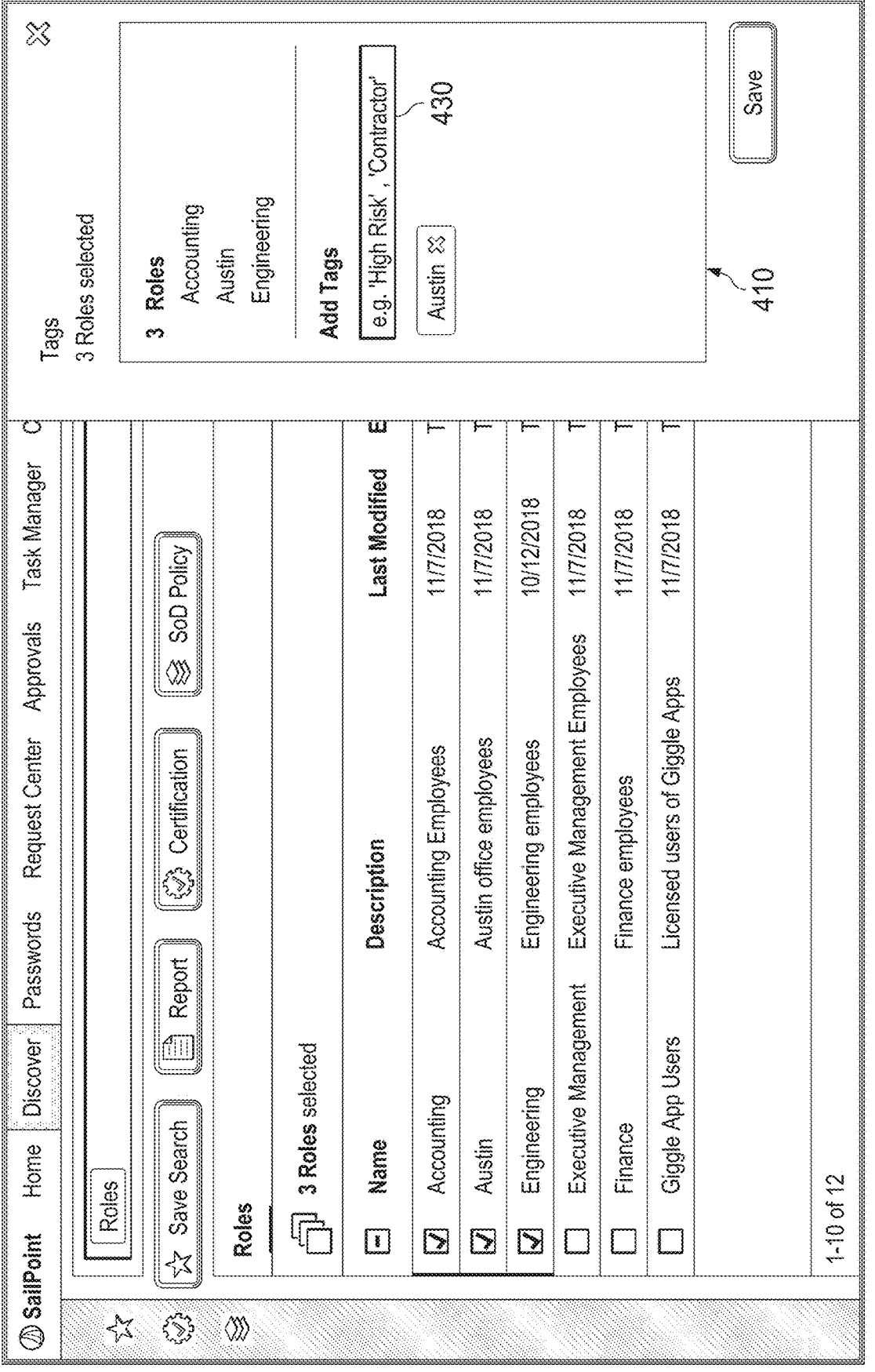
Figure 5B:
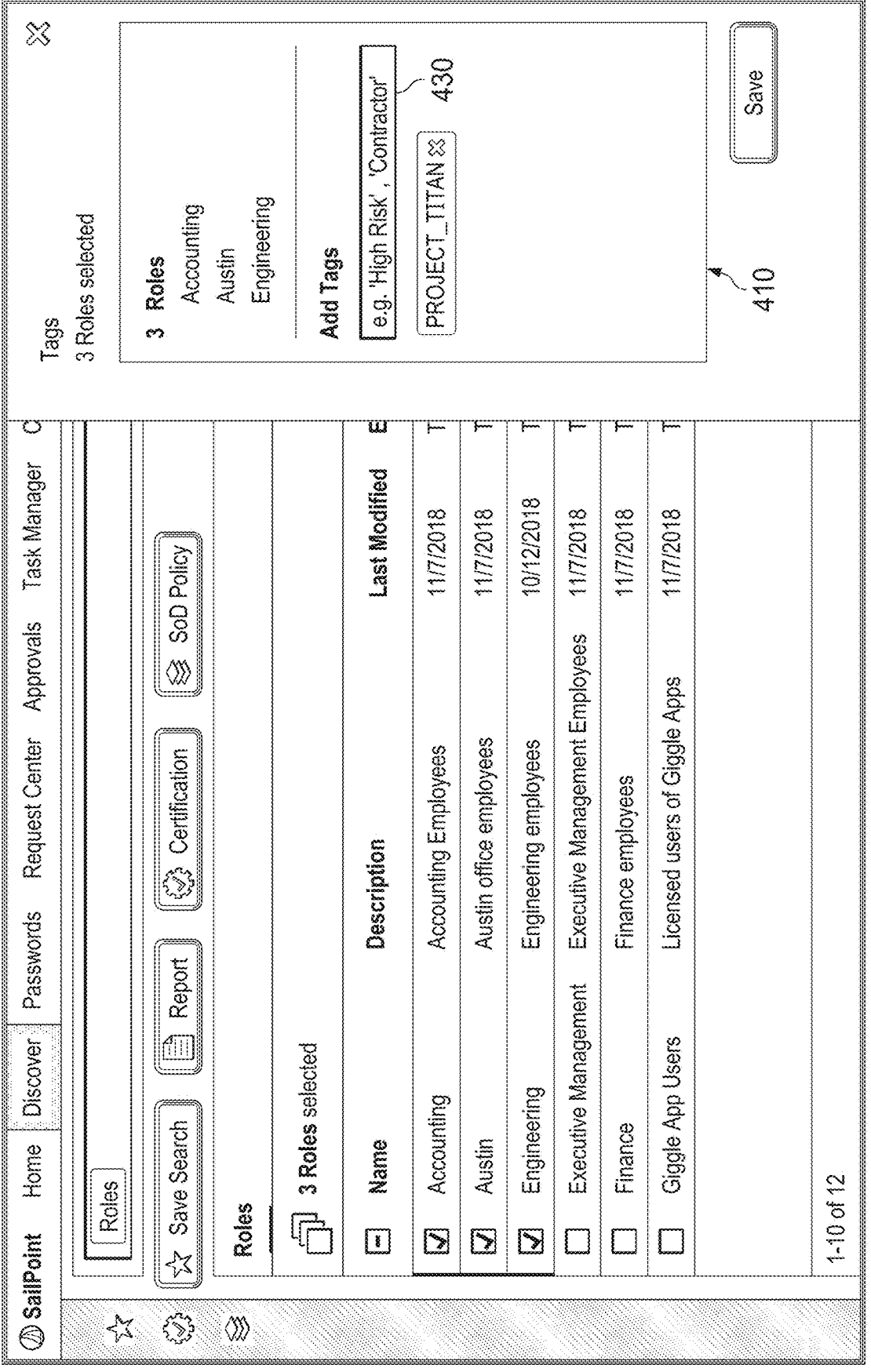

Looking at FIG. 5A, as tags are added using the text box 430, the added tags are displayed in the tagging portion 410 (e.g., in this example the tag "Austin"). Similarly, in FIG. 5B, as tags are added using the text box 430, the added tags are displayed in the tagging portion 410 (e.g., in this example the tag "Project_TITAN"). These tags will also be indexed (e.g., substantially in real-time) in association with the displayed artifacts by the identify management system.

Figure 6B:
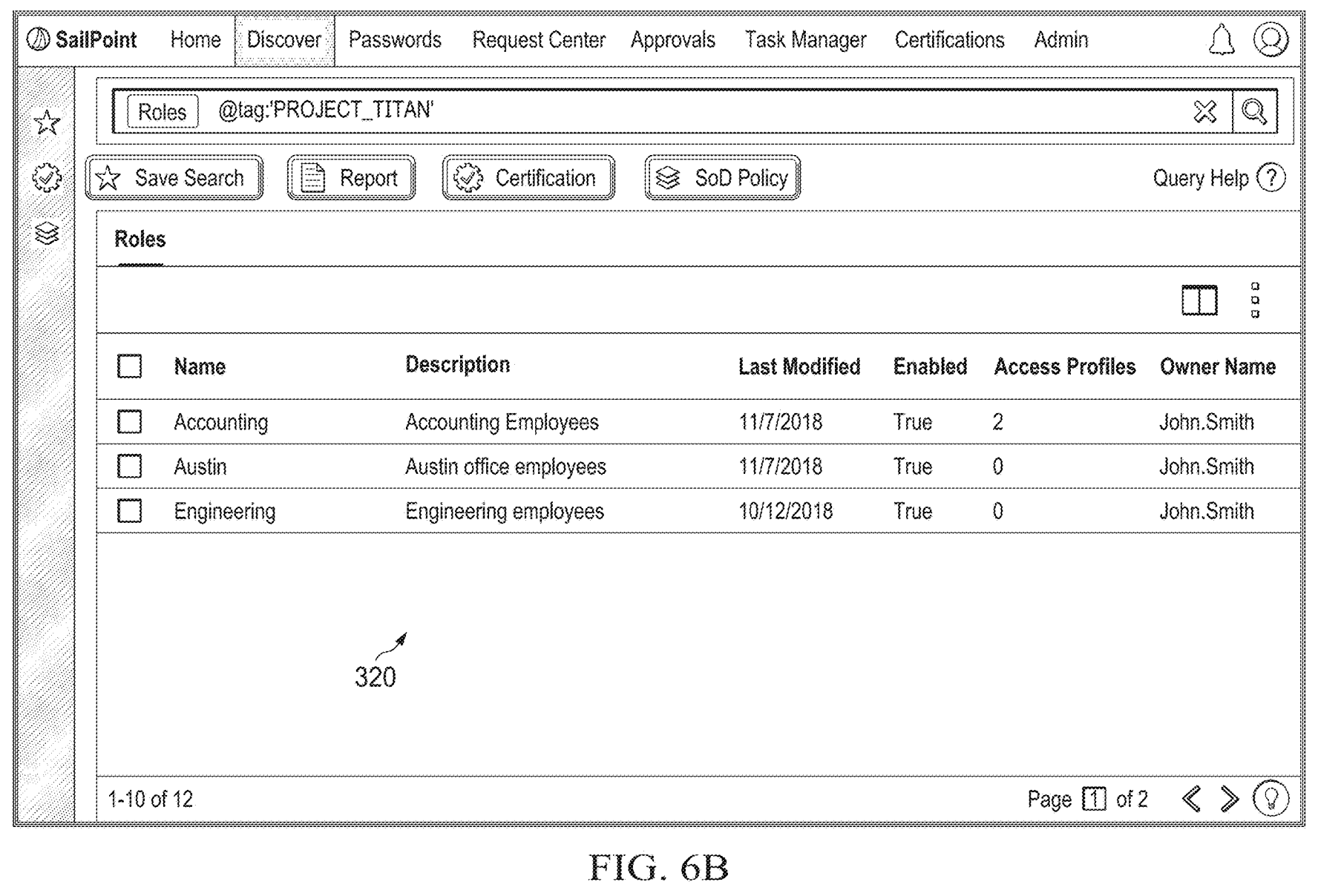
Figure 7:
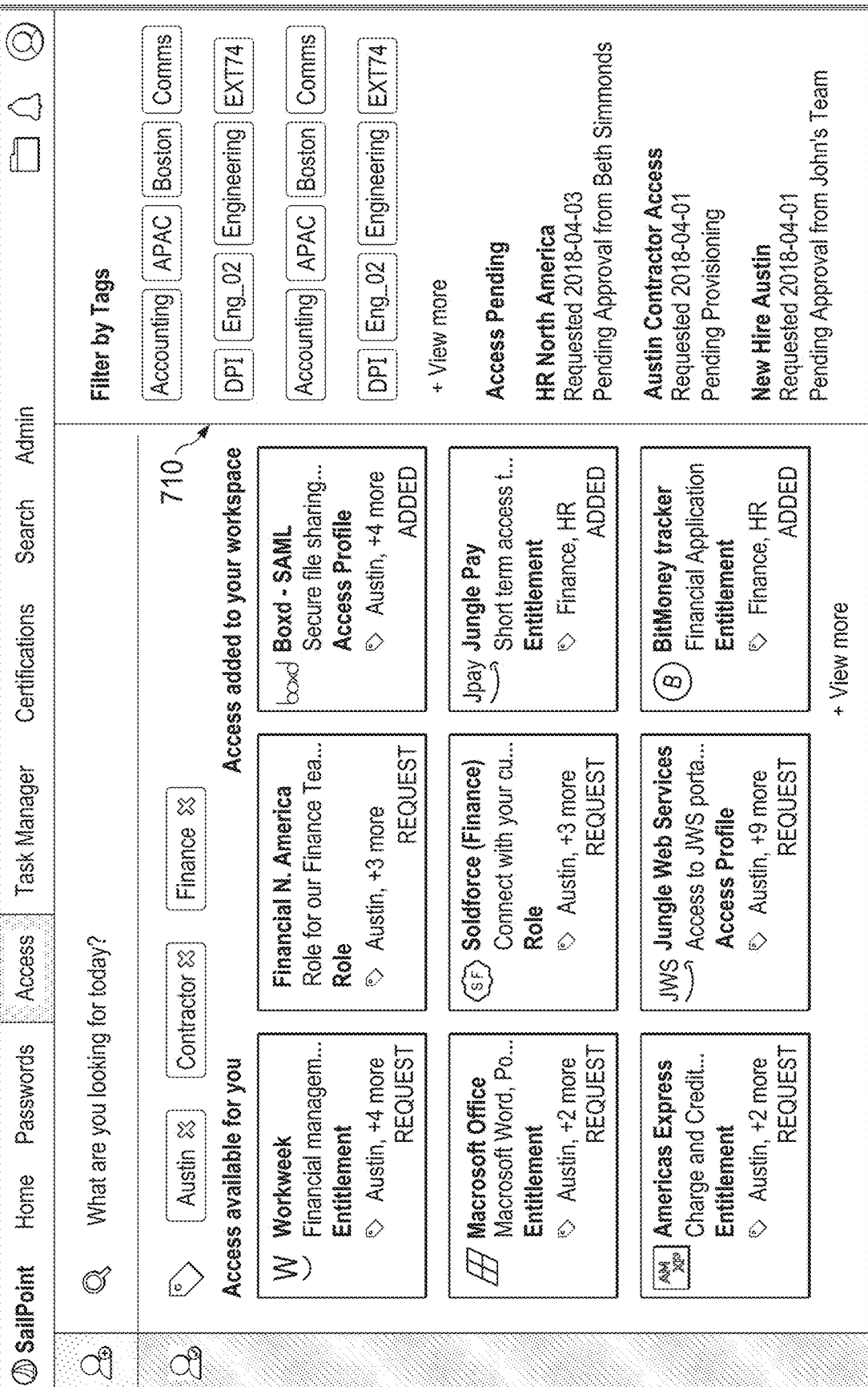

Now moving to FIGS. 6A and 6B, accordingly a user may also use the search portion 302 of the interface to search for artifacts with particular tags. This search may utilize a specialized search query language or syntax which allows the specification or indication of a search term indicates as search is to be performed on tags and the value of the tag. In FIG. 6A, for example a search is being conducted for artifacts with the tag "Austin" and the results from that search are displayed in the results portion 320 (e.g., the three previously tagged role artifacts "Accounting", "Austin" and "Engineering"). As another example, in FIG. 6B, a search is being conducted for artifacts with the tag "Project_TITAN" and the results from that search are displayed in the results portion 320 (e.g., the three previously tagged role artifacts "Accounting", "Austin" and "Engineering"). As still another example, FIG. 7 depicts an interface which allows a user to filter returned search results by one or more tags with which they are associated as depicted in tag filter portion 710 of the interface.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

APPENDIX

Search Syntax

The organization of documents according to embodiments is represented in JSON. All items in the JSON of the document can be searched, and examples of the syntax for such searching are defined below. Embodiments of the JSON data models for various artifacts are described below.

Because in particular embodiments, artifact data is stored in a JSON format, the data being searched for may be contained in multiple levels of categories. For example, if a search is being conducted for an identity's first name as it's listed in the identity document a search may need to specify that is to be used to search in that identity's attribute and for searching the firstname attribute. The search may also specify the first name (e.g., value) that is actually being searched for. Each of these levels of data helps obtain better quality search results, and may be referred to differently.

First-Level Field Searches

To search first-level fields, embodiments of the syntax may utilize the following format:

field:<search terms>

First level fields may include second-level fields or nested-level fields, as will be described at a later point. When a category to search within to find data is specified in a search, the deepest category searched in is the first-level field. In some cases, only need a single field is needed for a search. This is the first-level field. If more than one field to is needed to find desired data, the category that is typed last and that appears closest to the search terms in the query, is the first-level field. A first-level field contains actual data, as opposed to containing additional fields to search in.

Figure 8A:
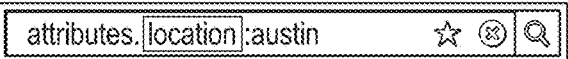
FIGS. 8A-8H are depictions of examples of search queries according to an embodiment of a search syntax.

For example, in the search query in FIG. 8A, "location" is the first-level field. Visually, it's the closest field to the data, before the colon, which indicates it's the category that contains the data being searched for.

Figure 8B:
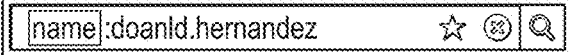
Figure 8C:

As another example, in the search query in FIG. 8B, "name" is the first level field. In searches where there's only one field listed, that may always be the first-level field. In the search query in FIG. 8C there are three first level fields, because there are three parts to the query. These fields are "name," "privileged," and "entitlementCount."

Second Level Field Searches

Second-level fields are a type of object. In JSON, an object is any category that, instead of containing data, contains more fields. Each second-level field contains a specific set of first-level fields. In embodiments of a search syntax, these fields are followed by a period, a first-level field, and the search term. This means that second-level fields and nested-level fields are both objects. Each second-level field contains at least one first-level field. They can give additional information about your identities and their data.

To search second-level fields, embodiments of the search syntax may use the following format:

secondLevelField.firstLevelField:<search terms>

For example, attributes.firstname:John will return all identities with John in their firstname attribute in the enterprise.

Figure 8D:
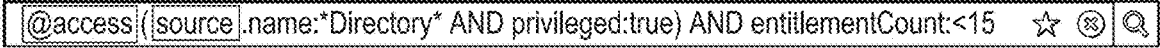
Figure 8E:
Figure 8F:
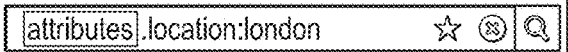
Figure 8G:
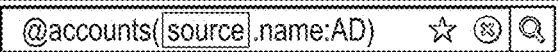

For example, in the search query in FIG. 8D "@access" and "source" are both objects. In the search query in FIGS. 8E and 8F "attributes" is an object, because it contains the first-level field "firstname" or "location", while In the query in FIG. 8G, "source" is the second-level field, because it contains the first-level field "name." It's contained within a nested object called "@accounts."

Structure for Nested Queries

If a JSON line has two or more levels of data inside of it, it's known as a nested object, and embodiments may utilize a nested query to search nested objects of documents for artifacts. For example, applications, accounts, and access artifacts may include nested objects, and may require nested queries because an identity can have more than one of each type. Nested objects can contain second- and first-level fields, or only first-level fields. In embodiments of the syntax these nested queries may be preceded by an @ symbol.

To create a nested query, the format is:

@nestedObject(secondLevelField.firstLevelField:query).

Figure 8H:
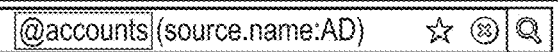

For example in the query depicted in FIG. 8H, "@accounts" is the nested object. It contains the second-level field "source," which contains the first level field "name."

Example Document Models

Tag Category Document Model

```
"tag": {
    "name": "text",
    "owner": "text",
    "risk": "",
    "priority": "number",
    "tag categories": tag_category,
    "archive date": "date",
    "delete_date": "date",
    "create_date": "date"
    }
"tag_category": {
    "name": "text",
    "owner": "text",
    "internal": "boolean",
    # Tag to tags
    }
```

Access Profile Document Model

```
"accessprofile": {
    "id": "keyword",
    "name": "text",
    "description": "text",
    "modified": "date", // ISO 8601 format
    "created": "date", // ISO 8601 format
    "requestable": "boolean",
    "@entitlements": {
        "id": "keyword",
        "name": "text",
        "description": "text",
        "attribute": "text",
        "value": "text"
    },
    "entitlementCount": "integer",
    "owner": {
        "id": "keyword",
        "name": "text"
    },
    "@tags": {
        "id": "keyword"
        "name" : "text"
        "type": "TAG"
    },
    "source": {
        "id": "keyword",
        "name": "text"
    },
    "synced": "date"
}
```

Sample

```
{
   "id": "id",
   "name": "name",
   "description": "description",
   "modified": "2018-09-07T17:49:33.667Z",
   "created": "2018-09-07T17:49:33.667Z",
   "requestable": true,
   "entitlements": [
      {
         "id": "entitlementId",
         "name": "name",
         "description": "description",
         "attribute": "attribute",
         "value": "value",
      }
   ],
   "entitlementCount": 1,
   "owner": {
      "name": "displayName",
      "id": "ownerId"
   },
"tags": [
      {
            "id": "2c9084ee5a8ad545345345a8de370110083",
               "name" : "SOD-SOX",
                  "type": "TAG"
      },
      {
            "id": "2c9084ee5a8ad545345345a8de370122093",
               "name" : "PrivilegedAccess",
                  "type": "TAG"
      },
]
   "source": {
      "name": "sourceName",
      "id": "sourceId"
   },
   "synced": "2018-09-07T17:44:29.362Z"
   }
}
```

AccountActivities Document Model

```
         "accountactivities": {
               "@accountRequests": {
                  "accountId": "text",
                  "attributeRequests": {
                     "name": "text",
                     "op": "keyword",
                     "value": "text"
                  },
                  "op": "keyword",
                  "provisioningTarget": {
                     "id": "keyword",
                     "name": "text",
                     "type": "text"
                  },
                  "result": {// dynamic object
                     "errors": "text",
                     "status": "keyword",
                     "ticketId": "keyword"
                  },
                  "source": {
                     "id": "keyword",
                     "name": "text",
                     "type": "text"
                  }
               },
               "@approvals": {
                  "comments": "text",
                  "created": "date",
                  "modified": "date",
```

-continued

```
                  "owner": {
                     "id": "keyword",
                     "name": "text",
                     "type": "keyword"
                  },
                  "result": "keyword",
                  "type": "keyword"
               },
               "created": "date",
               "errors": "text",
               "execution": "keyword",
               "@expansionItems": {
                  "accountId": "text",
                  "attributeRequest": {
                     "name": "text",
                     "op": "keyword",
                     "value": "text"
                  },
                  "cause": "keyword",
                  "name": "text",
                  "source": {
                     "id": "keyword",
                     "name": "text",
                     "type": "text"
                  }
               },
               "id": "keyword",
               "modified": "date",
               "name": "text",
               "origin": "text",
               "@originalRequest": {
                  "accountId": "text",
                  "attributeRequests": {
                     "name": "text",
                     "op": "keyword",
                     "value": "text"
                  },
                  "op": "keyword",
                  "source": {
                     "id": "keyword",
                     "name": "text",
                     "type": "text"
                  }
               },
               "requester": {
                  "id": "keyword",
                  "name": "text",
                  "type": "keyword"
               },
               "sourceSummary": "keyword"
               "status": "keyword",
               "target": {
                  "id": "keyword",
                  "name": "text",
                  "type": "keyword"
               },
               "trackingId": keyword",
               "type": "text",
               "warnings": "text"
         }
   }
```

Sample

```
{
   "id": "2c92808d60ec4e900160ec944db5000a",
   "name": "00000123455",
   "trackingId": "123455",
   "created": "2018-04-11T14:00:00Z",
   "modified": "2018-04-13T12:19:00Z",
   "status": "Incomplete",
   "execution": "Executing",
   "requester": {
      "id": "2c92808d60ec4e900160ec944db50012",
      "name": "Billy Rosewood",
      "type": "identity"
   },
```

US 12,592,985 B2

33
-continued

```
"target": {
    "id": "2c92808d60ec4e900160ec944db5012",
    "name": "Billy Rosewood",
    "type": "identity"
},
"errors": [ ],
"warnings": [ ],
"approvals": [{
        "created": "2018-04-11T12:20:00Z",
        "modified": "2018-04-12T12:13:01Z",
        "owner": {
            "id":
            "2c92808d60ec4e900160ec944db50013",
            "name": "Axel Foley",
            "type": "identity"
        },
        "result": "Approved",
        "comments": "Good to go."
    },
    {
        "created": "2018-04-12T12:13:01Z",
        "modified": "2018-04-12T20:13:01Z", "type":
        "Access Profile Owner",
        "owner": {
        "id": "2c92808d60ec4e900160ec944db50014",
        "name": "Dan Taggert",
        "type": "identity"
        },
        "result": "Approved",
        "comments": "If Axel agrees, I agree."
    }
],
"originalRequest": [{
    "accountId": "billy.rosewood",
    "op": "Assign",
    "source": {
        "id": "2c92808b60ec4e800160ec929d92001c",
        "name": "IdentityNow",
        "type": "internal"
    },
    "attributeRequests": [{
        "op": "Add",
        "name": "assignedRoles",
        "value": "Detectives"
    }]
}],
"expansionItems": [{
    "cause": "Role",
    "name": "Detectives",
    "attributeRequest": {
        "operation": "Add",
        "name": "",
        "value": "",
    }
    "source": {
        "id": "IdentityNow",
        "name": "IdentityNow",
        "type": "IdentityNow"
    }
    "accountId": "billy.rosewood"
}]
"accountRequests": [{
    "accountId": "cn=Billy Rosewood,dc=Users,
    dc=beverlyhillspd,dc=com",
    "op": "Modify",
    "source": {
        "id": "2c92808b60ec4e800160ec929d92001c",
        "name": "BHPD Active Directory",
        "type": "Active Directory"
    },
    "provisioningTarget": {
        "id": "2c92808b60ec4e800160ec929d92001c",
        "name": "BHPD Active Directory",
        "type": "Active Directory"
    },
```

34
-continued

```
    "attributeRequests": [{
        "op": "Add",
        "name": "memberOf",
        "value": "cn=Detectives,dc=Groups,dc=Users,
        dc=beverlyhillspd,dc=com"
    }],
    "result": {
        "status": "Success"
    }
}, {
    "accountId": "billy.rosewood",
    "op": "Modify",
    "source": {
        "id": "2c92808b60ec4e800160ec929d92001c",
        "name": "File",
        "type": "Delimited File"
    },
    "provisioningTarget": {
        "id":
        "2c92808b60ec4e800160ec929d92001d",
        "name": "Service Now",
        "type": "ServiceNowIntegration"
    },
    "attributeRequests": [{
        "op": "Add",
        "name": "groups",
        "value": "EvidenceSubmittal"
    }],
    "result": {
        "status": "Queued",
        "ticketId": "RITM001234"
    }
}, {
    "accountId": "billy.rosewood",
    "op": "Create",
    "source": {
        "id":
        "2c92808b60ec4e800160ec929d92001e",
        "name": "SAP P006",
        "source": "SAP"
    },
    "provisioningTarget": {
        "id":
        "2c92808b60ec4e800160ec929d92001e",
        "name": "SAP P006",
        "type": "SAP"
    },
    "attributeRequests": [{
        "op": "Set",
        "name": "UserName",
        "value": "billy.rosewood"
    },
    {
        "op": "Set",
        "name": "FirstName",
        "value": "Billy"
    },
    {
        "op": "Set",
        "name": "LastName",
        "value": "Rosewood"
    },
    {
        "op": "Set",
        "name": "Department",
        "value": "Detective"
    },
    {
        "op": "Set",
        "name": "Company",
        "value": "Beverly Hills Police Department"
    },
    {
    "op": "Set", "name":
    "Role", "value":
    "Detective"
    }
],
```

-continued

```
    "result": {
        "status": "Success",
        "ticketId": null
    }
}, {
    "accountId": "billy.rosewood",
    "op": "Create",
    "source": {
        "id":
        "2c92808b60ec4e800160ec929d920011",
        "name": "Salesforce",
        "type": "Salesforce"
    },
    "provisioningTarget": {
        "id":
        "2c92808b60ec4e800160ec929d920011",
        "name": "Salesforce",
        "type": "Salesforce"
    },
    "attributeRequests": [{
        "op": "Set",
        "name": "Email",
        "value": "billy.rosewood@bhpd.com"
    },
    {
        "op": "Set",
        "name": "FirstName",
        "value": "Billy"
    },
    {
        "op": "Set",
        "name": "LastName",
        "value": "Rosewood"
    },
    {
        "op": "Set", "name":
        "Profile", "value":
        "ChatterFree"
    }
    ],
    "result": {
        "status": "Error",
        "ticketId": null,
    "errors": [
        "Salesforce is down for maintenance."
    }
}]
}
```

Entitlement Document Model

```
    "entitlement": { "attribute":
        "text", "description":
        "text", "displayName":
        "text", "id": "keyword",
        "identityCount": "integer",
        "modified": "date",
        "name": "text",
        "privileged": "boolean",
        "@tags": {
            "id": "keyword"
            "name" : "text"
            "type": "TAG"
        },
        "source": {
            "id": "keyword",
            "name": "text"
        },
        "synced": "date",
        "value": "text"
    },
```

Sample

```
{
    "privileged": false,
    "displayName": "Administrator"
    "name": "Administrator",
    "description": "Full administrative access to IdentityNow",
    "modified": 1534184384805,
    "id": "ff8081815c46b85b015c46b90d5702a9",
    "tags": [
        {
            "id": "2c9084ee5a8ad545345345a8de370110083"
            "name" : "SOD-SOX",
            "type": "TAG"
        },
        {
            "id": "2c9084ee5a8ad545345345a8de370122093"
            "name" : "PrivilegedAccess",
            "type": "TAG"
        },
    ]
    "source": {
        "name": "IdentityNow",
        "id": "ff8081815c46b85b015c46b90c7c02a6"
    },
    "attribute": "assignedGroups",
    "identityCount": 5,
    "value": "ORG_ADMIN",
    "org": "navigate",
    "pod": "royale",
    "synced": "2018-09-04T03:30:23.853Z"
}
```

Event Document Model

```
    "event": {
        "action": "keyword",
        "actor": {
            "name": "keyword",
            "type": "keyword"
        },
        "attributes": { //"dynamic object"
            "SSO": {
                "contextId": "keyword",
                "ipAddress": "keyword"
            },
            "accountName": "text",
            "error": "text",
            "newValue": "text",
            "oldValue": "text",
            "requester": {
                "comments": "text",
                "name": "keyword",
                "type": "keyword"
            },
            "reviewer": {
                "comments": "text",
                "name": "keyword",
                "type": "keyword"
            },
            "sourceName": "text"
        },
        "created": "date",
        "description": "text",
        "hostname": "keyword",
        "id": "keyword",
        "ipAddress": "keyword"
        "requestId": "keyword",
        "stack": "keyword",
        "synced": "date",
        "target": {
            "name": "keyword",
            "type": "keyword"
        },
        "type": "text"
    }
```

Sample

```
{
    "id": "1aecf630-1e99-4541-aa29-a4524df406c3",
    "action": "AUTHENTICATION-103",
    "type": "AUTH",
    "actor": {
        "name": "support",
        "type": null
    },
    "target": {
        "name": "support",
        "type": null
    },
    "created": "2018-07-12T20:57:56.872Z",
    "stack": "SSO",
    "requestId": null,
    "hostname": "207.189.160.228",
    "ipAddress": "207.189.160.228",
    "description": null,
    "attributes": { "sourceId": null,
        "sourceName": "DataStore"
    },
    "pod": "royale",
    "org": "navigate",
    "modified": null,
    "synced": "2018-07-12T20:57:57.836Z"
}
```

Identity Document Model

```
        "identity": {
            "@access": {
                "attribute": "text",
                "description": "text",
                "disabled": "boolean",
                "displayName": "text",
                "id": "keyword",
                "name": "text",
                "owner": {
                    "displayName": "text",
                    "id": "keyword",
                    "name": "text"
                },
                "privileged": "boolean",
                "source": {
                    "id": "keyword",
                    "name": "text"
                },
                "standalone": "boolean",
                "type": "keyword",
                "value": "text"
            },
            "@tags": {
                    "id": "keyword"
                        "name" : "text"
                            "type": "TAG"
                },
            "@accounts": {
                "accountId": "text",
                "created": "date",
                "disabled": "boolean",
                "entitlementAttributes": "object",
                "id": "keyword",
                "locked": "boolean",
                "manuallyCorrelated": "boolean",
                "name": "text",
                "passwordLastSet": "date",
                "privileged": "boolean",
```

```
            "source": {
                "id": "keyword",
                "name": "text",
                "type": "keyword"
            }
        },
        "@apps": {
            "account": {
                "accountId": "text",
                "id": "keyword"
            },
            "id": "keyword",
            "name": "text",
            "source": {
                "id": "keyword",
                "name": "text"
            }
        },
        "@groups": {
            "id": "keyword",
            "name": "text"
        },
        "accessCount": "integer",
        "accessProfileCount": "integer",
        "accountCount": "integer",
        "appCount": "integer",
        "attributes": "dynamic object"
        "created": "date",
        "displayName": "text",
        "email": "text",
        "employeeNumber":
        "keyword",
        "entitlementCount": "integer",
        "firstName": "text",
        "groupCount": "integer",
        "id": "keyword",
        "identityProfile": {
            "id": "keyword",
            "name": "text"
        },
        "inactive": "boolean",
        "isManager": "boolean",
        "lastModified": "date",
        "lastName": "text",
        "manager": {
            "displayName": "text",
            "id": "keyword",
            "name": "text"
        },
        "modified": "date",
        "name": "text",
        "phone": "keyword",
        "processingDetails": {
            "date": "date",
            "message": "text",
            "retryCount": "integer",
            "stackTrace": "text",
            "stage": "keyword"
        },
        "processingState": "keyword"
        "roleCount": "integer",
        "source": {
            "id": "keyword",
            "name": "text"
        },
        "status": "keyword",
        "synced": "date"
    }
```

Sample

```
{
    "id": "2c9180865c45e7e3015c46c434a80622",
    "name": "ad.admin",
    "displayName": "AD Admin",
    "firstName": "AD",
    "lastName": "Admin",
```

```
    "email": "SLPT.CLOUD.SAILPOINT.TEST+AD-ADMIN@GMAIL.COM",
    "phone": null,
    "created": 1495835882664,
    "modified": 1534899614297,
    "inactive": false,
    "status": "UNREGISTERED",
    "employeeNumber": null,
    "manager": null,
    "isManager": false,
    "source": {
        "name": "EndToEnd-ADSource",
        "id": "2c9180855c45b230015c46c19b9c0202"
    },
    "processingDetails": null,
    "processingState": null,
    "attributes": {
        "uid": "ad.admin",
        "firstname": "AD",
        "cloudAuthoritativeSource": "2c9180855c45b230015c46c19b9c0202",
        "cloudStatus": "UNREGISTERED",
        "iplanet-am-user-alias-list": null,
        "displayName": "AD Admin",
        "internalCloudStatus": "UNREGISTERED",
        "workPhone": "512-942-7578",
        "email": "SLPT.CLOUD.SAILPOINT.TEST+AD-ADMIN@GMAIL.COM",
        "lastname": "Admin"
    },
    "tags": [
                {
                    "id": "2c9084ee5a8ad545345345a8de370110083"
                        "name" : "SOD-SOX",
                            "type": "TAG"
                },
                {
                    "id": "2c9084ee5a8ad545345345a8de370122093"
                        "name" : "PrivilegedAccess",
                            "type": "TAG"
                },
    ]
        "accounts": [
            {
                "id":
                "2c9180865c45e7e3015c46c434a80623",
                "name": "ad.admin",
                "accountId": "CN=AD Admin,OU=slpt-
automation,DC=TestAutomationAD,DC=local",
                "source": {
                    "name": "EndToEnd-ADSource",
                    "id": "2c9180855c45b230015c46c19b9c0202",
                    "type": "Active Directory - Direct"
                },
                "disabled": false,
                "locked": false,
                "privileged": false,
                "manuallyCorrelated": false,
                "passwordLastSet": 1451577767262,
                "entitlementAttributes": {
                    "memberOf": [
                        "CN=SpecificUsersFromSource-cloud.user,OU=Automation_Users,OU=slpt-
automation,DC=TestAutomationAD,DC=local",
                        "CN=TestProvisioningGroup1,OU=provisioningTests,OU=slpt-
automation,DC=TestAutomationAD,DC=local",
                        "CN=texas-sales,OU=Texas,OU=Americas,OU=slpt-automation-
unused,DC=TestAutomationAD,DC=local",
                        "CN=texas-engineering,OU=Texas,OU=Americas,OU=slpt-automation-
unused,DC=TestAutomationAD,DC=local",
                        "CN=UnittestNoOneBelongsToThisGroup,OU=LauncherTestOrg,OU=slpt-
automation,DC=TestAutomationAD,DC=local",
                        "CN=cloud support,OU=Automation_Users,OU=slpt-
automation,DC=TestAutomationAD,DC=local",
                        "CN=cloud development,OU=Automation_Users,OU=slpt-
automation,DC=TestAutomationAD,DC=local",
                        "CN=cloud testing,OU=Automation_Users,OU=slpt-
automation,DC=TestAutomationAD,DC=local",
                        "CN=LauncherTestGroup3,OU=LauncherTestOrg,OU=slpt-
automation,DC=TestAutomationAD,DC=local",
                        "CN=LauncherTestGroup2,OU=LauncherTestOrg,OU=slpt-
automation,DC=TestAutomationAD,DC=local",
                        "CN=LauncherTestGroup1,OU=LauncherTestOrg,OU=slpt-
```

```
automation,DC=TestAutomationAD,DC=local",
            "CN=globb,OU=HierarchicalGroups,OU=slpt-
automation- unused,DC=TestAutomationAD,DC=local",
            "CN=globa,OU=HierarchicalGroups,OU=slpt-
automation- unused,DC=TestAutomationAD,DC=local",
            "CN=DistTierUniversal,OU=HierarchicalGroups,OU=slpt-
automation- unused,DC=TestAutomationAD,DC=local",
            "CN=DistTierGlobal,OU=HierarchicalGroups,OU=slpt-
automation- unused,DC=TestAutomationAD,DC=local",
            "CN=DistTier4,OU=HierarchicalGroups,OU=slpt-
automation- unused,DC=TestAutomationAD,DC=local",
            "CN=GoldEntitlement,OU=testRegion,OU=slpt-
automation- unused,DC=TestAutomationAD,DC=local",
            "CN=DiamondEntitlement,OU=testRegion,OU=slpt-
automation- unused,DC=TestAutomationAD,DC=local",
            "CN=Denied RODC Password Replication
Group,CN=Users,DC=TestAutomationAD,D
            C=local", "CN=Group Policy
            Creator
Owners,CN=Users,DC=TestAutomationAD,DC=local",
            "CN=Domain Guests,CN=Users,DC=TestAutomationAD,DC=local",
            "CN=Domain Admins,CN=Users,DC=TestAutomationAD,DC=local",
            "CN=Enterprise Admins,CN=Users,DC=TestAutomationAD,DC=local",
            "CN=Schema Admins,CN=Users,DC=TestAutomationAD,DC=local",
            "CN=Guests,CN=Builtin,DC=TestAutomationAD,DC=local",
            "CN=Administrators,CN=Builtin,DC=TestAutomationAD,DC=local"
        ]
    },
    "created": 1495835882664
},
{

"id":
    "2c918083606d670c01606f35a30a03
    49", "name": "ad.admin",
    "accountId":
    "ad.admin",
    "source": {
        "name": "IdentityNow",
        "id":
        "ff8081815c46b85b015c46b90c7c02
        a6", "type": "IdentityNowConnector"
    },
    "disabled": false,
    "locked":
    false,
    "privileged": false,
    "manuallyCorrelated": false,
    "passwordLastSet":
    null,
    "entitlementAttributes": { }, "created":
    1513694274314
    }
]
,
"accountCount": 2,
"apps": [
    {
        "id": "22751",
        "name": "ADP
        Workforce Now",
        "source": {
            "name": "Corporate Active Directory",
            "id": "2c9180855c45b230015c46e2f6a8026a"
        },
        "account": {
            "id":
            "2c9180865c45efa4015c470be0de16
            06", "accountId": "CN=Barbara
Wilson,OU=Austin,OU=Americas,OU=Demo,DC=seri,DC=sailpointdemo,DC=com"
        }
    }
],
"appCount": 1,
"access": [
    {
        "privileged":
        false,
        "attribute":
        "memberOf",
```

-continued

```
        "value":
        "CN=Administrators,CN=Builtin,DC=TestAutomationAD,DC=local",
        "source": {
            "name": "EndToEnd-ADSource",
            "id": "2c9180855c45b230015c46c19b9c0202"
        },
        "standalone": false,
        "id":
        "2c9180865c45e7e3015c46c457c507
        55", "type": "ENTITLEMENT",
        "name":
        "Administrators",
        "displayName":
        "Administrators",
        "description": null
    },
    {
        "owner": {
            "id":
            "2c9180865c45e7e3015c46c434a806
            22", "name": "ad.admin",
            "displayName": "AD Admin"
        },
        "source": {
            "name": "EndToEnd-ADSource",
            "id": "2c9180855c45b230015c46c19b9c0202"
        },
        "id":
        "2c918083634bc6cb01639808d40270
        ba", "type": "ACCESS_PROFILE",
        "name": "test [Access Profile-
        1527264105448]", "displayName":
        "test",
        "description": "test"
    },
    {
        "disabled": false,
        "owner":
        {
            "id":
            "2c9180865c45e7e3015c46c5030707
            a0", "name": "will.albin",
            "displayName": "Albin Will"
        },
        "id":
        "2c9180865decdaa5015e06598b2931
        08", "type": "ROLE",
        "name": "test [cloudRole-
        1503345085223]", "displayName":
        "test",
        "description": "test"
    }
]
,
"accessCount": 3,
"entitlementCount": 1,
"roleCount": 1,
"accessProfileCount": 1,
"identityprofile":
{
    "id": "2c918085605c8d0601606f357cb231e6",
    "name":"E2E AD"
},
"org":
"navigate",
"pod":
"royale",
"synced": "2018-08-22T19:54:54.302Z"
}
}
```

60

Role Document Model

```
"role": {
    "id":
        "keyword",
```

-continued

```
    "name":
    "text",
    "description": "text",
    "modified": "date", // ISO
```

65

-continued

```
                              8601 format "created":
                        "date", // ISO 8601 format
                        "enabled": "boolean",
                   "requestable": "boolean",
                   "@tags": {
                                  "id": "keyword"
                                     "name" : "text"
                                         "type": "TAG"
                           },
                        "accessProfiles: {
                            "id": "keyword",
                             "name": "keyword",
                        },
                        "accessProfileCount:
                   "integer", "owner": {
                            "id": "keyword",
                             "name": "text"
                        },
                        "synced": "date"
                   }
```

Sample

```
   {
      "id": "id",
      "name": "name",
      "description":
      "description",
      "modified": "2018-09-
      07T17:49:33.667Z", "created":
      "2018-09-07T17:49:33.667Z",
      "enabled": true,
   "requestable": true,
   "tags": [
         {
               "id": "2c9084ee5a8ad545345345a8de370110083"
                  "name" : "SOD-SOX",
                     "type": "TAG"
         },
         {
               "id": "2c9084ee5a8ad545345345a8de370122093"
                  "name" : "PrivilegedAccess",
                     "type": "TAG"
         },
   ]
      "accessProfiles": [
            {
               "id": "accessProfileId",
               "name": "accessProfileName"
            }
      ],
      "accessProfileCount": 1,
      "owner": {
            "name": "displayName",
            "id": "ownerId"
      },
      "synced": "2018-09-07T17:49:33.667Z"
   }
```

What is claimed is:

1. An identity management system, comprising:
a processor;
a non-transitory, computer-readable storage medium, including computer instructions for:
maintaining a search index for identity management artifacts utilized in identity management of a distributed enterprise computing environment and determined based on identity management data obtained from one or more source systems in the distributed enterprise computing environment, the search index comprising a document for each of the identity management artifacts;
assigning, by a tagging service, a tag with a set of the identity management artifacts based on one or more defined tagging policies, wherein the one or more defined tagging policies are stored in a data store and each policy comprises a policy definition including a search criteria and one or more associated tags, the set of the identity management artifacts determined by identity management artifacts that meet a particular search criteria;
for each of the identity management artifacts in the set, determining the corresponding document;
storing the tag in each of the corresponding documents; and
indexing the tag in the search index, thereby allowing the set of identity management artifacts to be searched using the tag and the search index.

2. The identity management system of claim 1, wherein determining the set of identity management artifacts comprises searching the set of identity management artifacts based on the specified criteria.

3. The identity management system of claim 1, wherein the tag is assigned before at least one of the set of the identity management artifacts was determined from the identity management data.

4. The identity management system of claim 1, wherein the tag is indexed in association with the at least one of the set of the identity management artifacts at the same time the corresponding document for the at least one of the of the set of the identity management artifacts is determined or created in the search index.

5. The identity management system of claim 1, wherein determining the set of the identity management artifacts is based on an association of each of the set of the identity management artifacts with a particular identity management artifact.

6. The identity management system of claim 5, wherein the set of the identity management artifacts are identities and the particular identity management artifact is an entitlement.

7. The identity management system of claim 5, wherein the tag is obtained from the particular identity management artifact.

8. A method, comprising:
maintaining a search index for identity management artifacts utilized in identity management of a distributed enterprise computing environment and determined based on identity management data obtained from one or more source systems in the distributed enterprise computing environment, the search index comprising a document for each of the identity management artifacts;
assigning, by a tagging service, a tag with a set of the identity management artifacts based on one or more defined tagging policies, wherein the one or more defined tagging policies are stored in a data store and each policy comprises a policy definition including a search criteria and one or more associated tags, the set of the identity management artifacts determined by identity management artifacts that meet a particular search criteria;
for each of the identity management artifacts in the set, determining the corresponding document;
storing the tag in each of the corresponding documents; and
indexing the tag in the search index, thereby allowing the set of identity management artifacts to be searched using the tag and the search index.

9. The method of claim 8, wherein determining the set of identity management artifacts comprises searching the set of identity management artifacts based on the specified criteria.

10. The method of claim 8, wherein the tag is assigned before at least one of the set of the identity management artifacts was determined from the identity management data.

11. The method of claim 8, wherein the tag is indexed in association with the at least one of the set of the identity management artifacts at the same time the corresponding document for the at least one of the of the set of the identity management artifacts is determined or created in the search index.

12. The method of claim 8, wherein determining the set of the identity management artifacts is based on an association of each of the set of the identity management artifacts with a particular identity management artifact.

13. The method of claim 12, wherein the set of the identity management artifacts are identities and the particular identity management artifact is an entitlement.

14. The method of claim 12, wherein the tag is obtained from the particular identity management artifact.

15. A non-transitory computer readable medium, comprising instructions that are executable by one or more processors for:

maintaining a search index for identity management artifacts utilized in identity management of a distributed enterprise computing environment and determined based on identity management data obtained from one or more source systems in the distributed enterprise computing environment, the search index comprising a document for each of the identity management artifacts;

assigning, by a tagging service, a tag with a set of the identity management artifacts based on one or more defined tagging policies, wherein the one or more defined tagging policies are stored in a data store and each policy comprises a policy definition including a search criteria and one or more associated tags, the set of the identity management artifacts determined by identity management artifacts that meet a particular search criteria;

for each of the identity management artifacts in the set, determining the corresponding document;

storing the tag in each of the corresponding documents; and indexing the tag in the search index, thereby allowing the set of identity management artifacts to be searched using the tag and the search index.

16. The non-transitory computer readable medium of claim 15, wherein determining the set of identity management artifacts comprises searching the set of identity management artifacts based on the specified criteria.

17. The non-transitory computer readable medium of claim 15, wherein the tag was associated before at least one of the set of the identity management artifacts was determined from the identity management data.

18. The non-transitory computer readable medium of claim 15, wherein the tag is indexed in association with the at least one of the set of the identity management artifacts at the same time the document for the at least one of the of the set of the identity management artifacts is determined or created in the search index.

19. The non-transitory computer readable medium of claim 15, wherein the set of the identity management artifacts is based on an association of each of the set of the identity management artifacts with a particular identity management artifact.

20. The non-transitory computer readable medium of claim 19, wherein the set of the identity management artifacts are identities and the particular identity k management artifact is an entitlement.

* * * * *